(12) United States Patent
Scholten et al.

(10) Patent No.: US 10,602,898 B2
(45) Date of Patent: Mar. 31, 2020

(54) AUTONOMOUS FLOOR CLEANING SYSTEM

(71) Applicant: BISSELL Homecare, Inc., Grand Rapids, MI (US)

(72) Inventors: Jeffrey A. Scholten, Grand Rapids, MI (US); Alan J. Krebs, Pierson, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 4 days.

(21) Appl. No.: 15/994,216

(22) Filed: May 31, 2018

(65) Prior Publication Data

US 2018/0344114 A1    Dec. 6, 2018

Related U.S. Application Data

(60) Provisional application No. 62/515,300, filed on Jun. 5, 2017.

(51) Int. Cl.
*A47L 9/28* (2006.01)
*A47L 11/40* (2006.01)
(Continued)

(52) U.S. Cl.
CPC ........... *A47L 9/2826* (2013.01); *A47L 7/0004* (2013.01); *A47L 9/2805* (2013.01); *A47L 9/2894* (2013.01); *A47L 11/30* (2013.01); *A47L 11/4011* (2013.01); *G05D 1/0088* (2013.01); *G05D 1/0259* (2013.01); *G05D 1/0291* (2013.01); *G05D 1/03* (2013.01); *A47L 9/2852* (2013.01); *A47L 11/4044* (2013.01); *A47L 2201/00* (2013.01);
(Continued)

(58) Field of Classification Search
CPC ............. A47L 2201/04; A47L 2201/06; A47L 9/2894; A47L 9/2826; A47L 11/4011; G05D 1/028; G05D 1/0234; G05D 1/0276; G05D 1/0259; G05D 1/03; G05D 2201/0203; G05D 2201/0215; G01S 2201/02
See application file for complete search history.

(56) References Cited

U.S. PATENT DOCUMENTS 5,613,261 A   3/1997 Kawakami
5,709,007 A   1/1998 Chiang
(Continued)

FOREIGN PATENT DOCUMENTS

CN   205441113 U   8/2016
CN   106618392 A   5/2017
(Continued)

OTHER PUBLICATIONS

European Search Report to 18174675.1 dated Jan. 8, 2019.
(Continued)

*Primary Examiner* — Bryan R Muller
(74) *Attorney, Agent, or Firm* — McGarry Bair PC

(57) ABSTRACT

A floor cleaning system includes multiple autonomous floor cleaners or robots. The robots are configured to share a mapping, navigation, and/or stain sensing system. A first robot carries the mapping, navigation, and/or stain sensing system, and a second robot receives information from the mapping, navigation, and/or stain sensing system of the first robot. The system can include at least one dry vacuuming robot and at least one deep cleaning robot.

24 Claims, 16 Drawing Sheets

US 10,602,898 B2

Page 2

(51) Int. Cl.
*G05D 1/03* (2006.01)
*G05D 1/02* (2020.01)
*A47L 7/00* (2006.01)
*A47L 11/30* (2006.01)
*G05D 1/00* (2006.01)

(52) U.S. Cl.
CPC ..... *A47L 2201/022* (2013.01); *A47L 2201/06* (2013.01); *G05D 1/0219* (2013.01); *G05D 2201/0203* (2013.01); *Y10S 901/01* (2013.01)

(56) References Cited

U.S. PATENT DOCUMENTS

| | | | |
|---|---|---|---|
| 5,825,981 A | 10/1998 | Matsuda | |
| 6,374,155 B1 | 4/2002 | Wallach | |
| 6,446,302 B1 | 9/2002 | Kasper | |
| 6,496,755 B2 | 12/2002 | Wallach | |
| 7,054,716 B2 | 5/2006 | McKee | |
| 7,320,149 B1 | 1/2008 | Huffman | |
| 8,606,404 B1 | 12/2013 | Huffman | |
| 8,719,998 B1 | 5/2014 | Huffman | |
| 8,755,936 B2 | 6/2014 | Friedman | |
| 9,687,131 B2 | 6/2017 | Eidmohammadi | |
| 2006/0293794 A1* | 12/2006 | Harwig | G05D 1/0261 700/253 |
| 2007/0050937 A1 | 3/2007 | Song | |
| 2014/0124004 A1 | 5/2014 | Rosenstein et al. | |
| 2015/0128996 A1* | 5/2015 | Dooley | A47L 11/125 134/6 |
| 2015/0297052 A1 | 10/2015 | Eidmohammadi | |
| 2016/0027207 A1 | 1/2016 | Hillen | |
| 2018/0078106 A1 | 3/2018 | Scholten | |
| 2018/0092499 A1* | 4/2018 | Strazisar | G05D 1/0246 |
| 2018/0361569 A1* | 12/2018 | Hackert | B25J 9/0084 |

FOREIGN PATENT DOCUMENTS

| | | | | |
|---|---|---|---|---|
| EP | 2980670 A2 | 2/2016 | | |
| EP | 3069644 A1 | 9/2016 | | |
| JP | 2007082639 A * | 4/2007 | | |
| WO | 2016073103 A1 | 5/2016 | | |
| WO | 17016813 A1 | 2/2017 | | |
| WO | 17032718 A1 | 3/2017 | | |
| WO | 17036532 A1 | 3/2017 | | |
| WO | WO-2017036532 A1 * | 3/2017 | ......... | A47L 9/2852 |
| WO | 2017073955 A1 | 5/2017 | | |

OTHER PUBLICATIONS

Israael A. Wagner, Michael Lindenbaum, and Alfred M. Bruckstein, "Distributed Covering by Ant-Robots Using Evaporating Traces", IEEE Transactions on Robotics and Automation, vol. 15, No. 5, Oct. 1999, 16 Pages.

* cited by examiner

AUTONOMOUS FLOOR CLEANING SYSTEM

CROSS REFERENCE TO RELATED APPLICATION(S)

This application claims the benefit of U.S. Provisional Patent Application No. 62/515,300, filed Jun. 5, 2017, which is incorporated herein by reference in its entirety.

BACKGROUND

Autonomous or robotic floor cleaners can move without the assistance of a user or operator in order to clean a floor surface. For example, the floor cleaner can be configured to sweep dirt (including dust, hair, and other debris) into a collection bin carried on the floor cleaner and/or to sweep dirt using a cloth which collects the dirt. The floor cleaner can move randomly about a surface while cleaning the floor surface or use a mapping/navigation system for guided navigation about the surface. Some floor cleaners are further configured to apply and extract liquid for deep cleaning carpets, rugs, and other floor surfaces.

BRIEF DESCRIPTION

An aspect of the present disclosure relates to an autonomous floor cleaning system, including a dry vacuuming robot for generating a working airflow for removing dirt from a surface to be cleaned and storing the dirt in a collection space, the dry vacuuming robot further including a drive system for autonomously moving the dry vacuuming robot over the surface to be cleaned, a stain sensing system for detecting a stain, and a beacon deployment system for selectively deploying a beacon at the location of the stain, a deep cleaning robot for storing a cleaning fluid and delivering the cleaning fluid to the surface to be cleaned, and for removing the cleaning fluid and debris from the surface to be cleaned and storing the recovered cleaning fluid and debris, the deep cleaning robot further including a controller for controlling the operation of the deep cleaning robot, and a drive system for autonomously moving the deep cleaning robot over the surface to be cleaned based on inputs from the controller, and wherein the dry vacuuming robot is configured to detect the stain via the stain sensing system and deploy the beacon at the location of the detected stain and the beacon is operably coupled to the controller such that the beacon guides the deep cleaning robot to the location.

Another aspect of the present disclosure relates to an autonomous floor cleaning system, including a dry vacuuming robot for generating a working airflow for removing dirt from a surface to be cleaned and storing the dirt in a collection space on the dry vacuuming robot and having a drive system for autonomously moving the dry vacuuming robot over the surface to be cleaned, and a deep cleaning robot for storing a cleaning fluid and delivering the cleaning fluid to the surface to be cleaned, and for removing the cleaning fluid and debris from the surface to be cleaned and storing the recovered cleaning fluid and debris and having a drive system for autonomously moving the deep cleaning robot over the surface to be cleaned, and wherein at least one of the dry vacuuming robot or the deep cleaning robot is configured for traveling along a first path and wherein the at least one dry vacuuming robot or the deep cleaning robot includes a stain sensing system for detecting a stain while traveling along the first path and a navigation system configured for guiding movement of the other of the dry vacuuming robot or the deep cleaning robot to the stain along a path that is distinct from the first path.

DETAILED DESCRIPTION

Aspects of the present disclosure generally relate to a floor cleaning system that includes multiple unattended, autonomous floor cleaners, or robot cleaners to autonomously clean floor surfaces, including soft surfaces such as carpets and rugs, and hard surfaces such as hardwood, tile, and linoleum. The robots are configured to share a mapping, navigation, and/or stain sensing system. A first robot carries the mapping, navigation, and/or stain sensing system, and a second robot receives information from the mapping, navigation, and/or stain sensing system of the first robot.

One robot may be a dry vacuuming robot that includes a vacuum collection system for generating a working air flow for removing dirt from the surface to be cleaned and storing the dirt in a collection space on the vacuum cleaner mounted in or carried on an autonomously moveable unit Another robot may be a wet, or deep cleaning robot that includes a fluid supply system for storing cleaning fluid and delivering the cleaning fluid to the surface to be cleaned and a fluid recovery system for removing the cleaning fluid and debris from the surface to be cleaned and storing the recovered cleaning fluid and debris mounted in or carried on an autonomously moveable unit.

Figure 1:
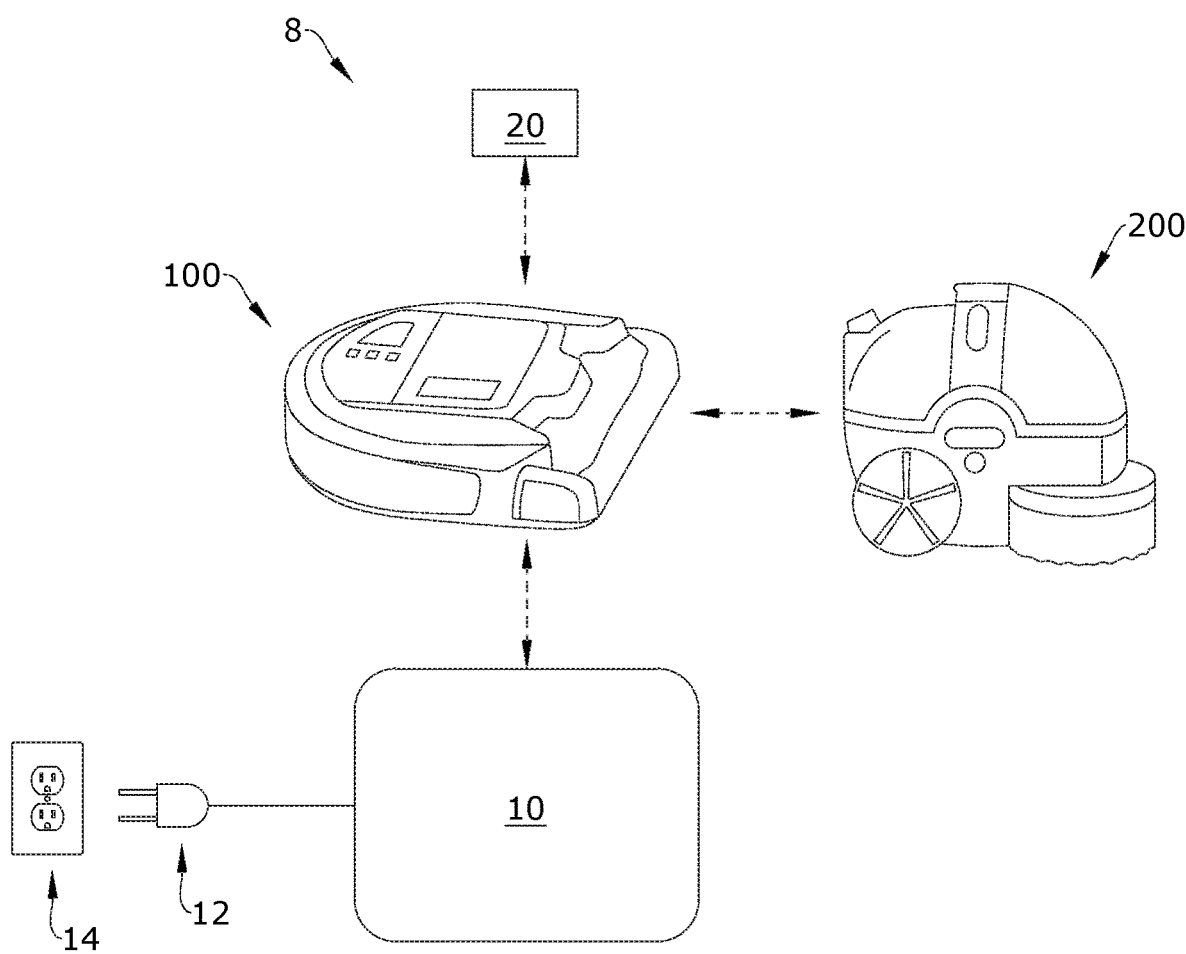
FIG. 1 is a schematic view of an autonomous floor cleaning system according to various aspects described herein.

FIG. 1 is a schematic view of an autonomous floor cleaning system 8 according to aspects described herein. The system 8 is a multi-robot system 8 including at least one dry vacuuming robot 100 and at least one deep cleaning robot 200. Rather than duplicate expensive mapping and navigation components, the robots 100, 200 are configured to share these particular high-cost resources. The system 8 uses a primary/secondary protocol, with one robot (the primary) controlling another robot (the secondary). The primary robot comprises full mapping, navigation, and stain sensing technology and hardware. The secondary robot however, can be a less intelligent robot without those features, and instead is configured to leverage the mapping, navigation, and stain sensing of the primary robot. This offers an autonomous floor cleaning system 8 with a greater range of cleaning capabilities, while avoiding duplication of certain components, and therefore provides a lower cost solution compared to two full-feature robots.

In one example, the dry vacuuming robot 100 is the primary and the deep cleaning robot 200 is the secondary. This configuration provides multi-function cleaning capability, but reduces the overall cost and complexity of the deep cleaning robot 200. The deep cleaning robot 200 operates in coordination with the dry vacuuming robot 100 to use the intelligence of the dry vacuuming robot 100, including its mapping, navigation, and stain sensing systems. In one example, the intelligence of a dry vacuuming robot 100 can be used to locate and identify spots and stains, and a simpler, specialized deep cleaning robot 200 can be instructed to clean these spots and stains.

The robots 100, 200 of the system 8 can share a common docking station 10 for recharging the robots 100, 200 or servicing the robots 100, 200 in other ways. In one example, the docking station 10 can be connected to a household power supply, such as an A/C power outlet 14, and can include a converter 12 for converting the AC voltage into DC voltage for recharging the power supply on-board each robot 100, 200. The docking station 10 can also include various sensors and emitters (not shown) for monitoring robot status, enabling auto-docking functionality, communicating with each robot 100, 200, as well as features for network and/or Bluetooth connectivity.

An artificial barrier system 20 can also be provided with the system 8 for containing the robots 100, 200 within a user-determined boundary. The dry vacuuming robot 100 can be configured to directly interact with the artificial barrier system 20, while the deep cleaning robot 200 can be configured to only indirectly interact with the artificial barrier system 20 via the dry vacuuming robot 100.

Figure 2:
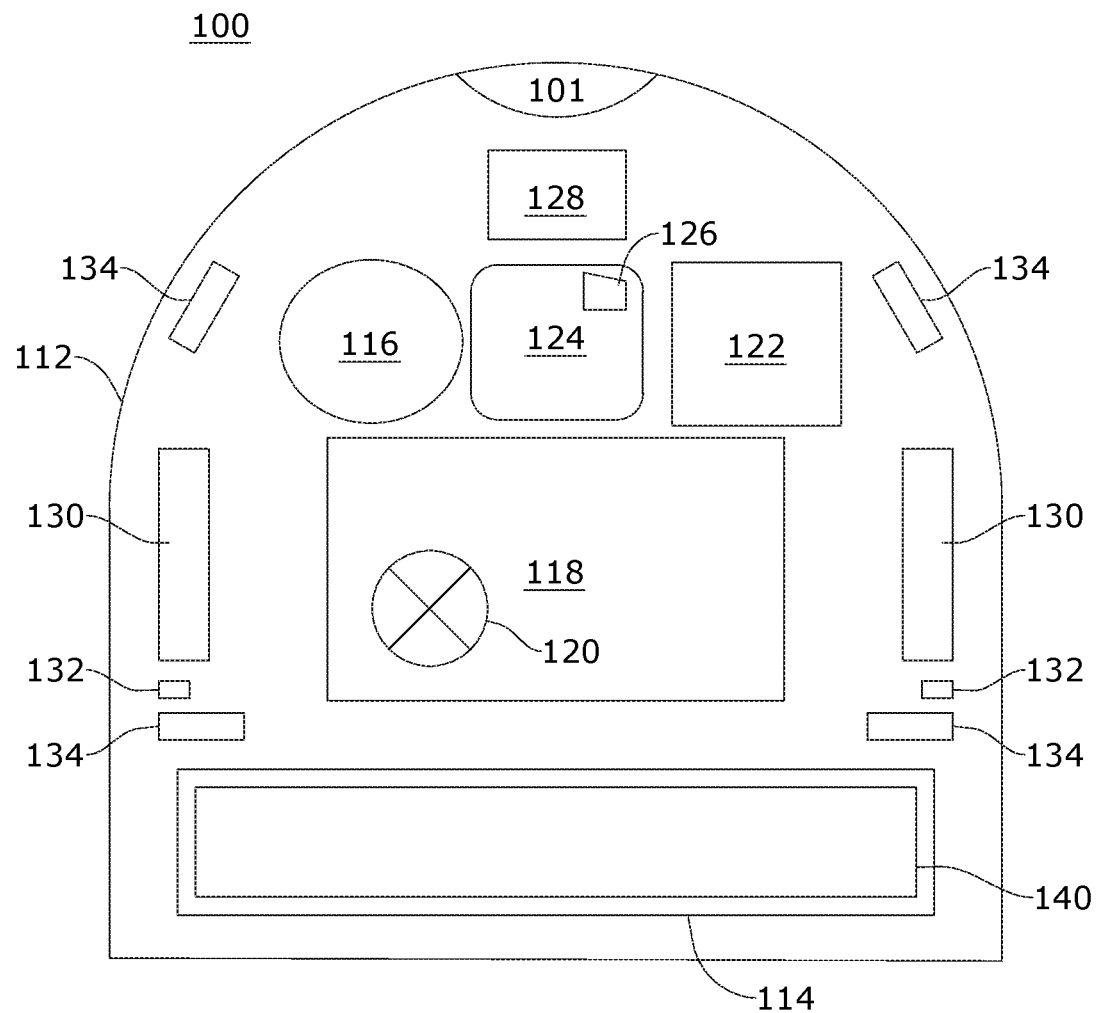
FIG. 2 is a schematic illustration of an autonomous vacuum cleaner of the system of FIG. 1 according to various aspects described herein.

FIG. 2 is a schematic view of one embodiment of an autonomous vacuum cleaner, or dry vacuuming robot 100 for the autonomous floor cleaning system 8. The dry vacuuming robot 100 mounts the components of various functional systems of the vacuum cleaner in an autonomously moveable unit or housing 112, including components of a vacuum collection system for generating a working air flow for removing dirt (including dust, hair, and other debris) from the surface to be cleaned and storing the dirt in a collection space on the vacuum cleaner, a drive system for autonomously moving the vacuum cleaner over the surface to be cleaned, and a navigation/mapping system for guiding the movement of the dry vacuuming robot 100 over the surface to be cleaned, generating and storing maps of the surface to be cleaned, and recording status or other environmental variable information. The autonomous or robotic vacuum cleaner can have similar properties to the autonomous or robotic vacuum cleaner described in U.S. Patent Application Publication No. 2018/0078106, published Mar. 22, 2018, and is incorporated herein by reference.

A controller 128 is operably coupled with the various function systems of dry vacuuming robot 100 for controlling its operation. The controller 128 can be a microcontroller unit (MCU) that contains at least one central processing units (CPUs).

The vacuum collection system can include a working air path through the unit having an air inlet and an air outlet, a suction nozzle 114 which is positioned to confront the surface to be cleaned and defines the air inlet, a suction source 116 in fluid communication with the suction nozzle 114 for generating a working air stream, and a collector or dirt bin 118 for collecting dirt from the working airstream for later disposal. The suction nozzle 114 can define the air inlet of the working air path. The suction source 116 can be a vacuum motor carried by the unit 112, fluidly upstream of the air outlet, and can define a portion of the working air path. The dirt bin 118 can also define a portion of the working air path, and comprise a dirt bin inlet in fluid communication with the air inlet. A separator 120 can be formed in a portion of the dirt bin 118 for separating fluid and entrained dirt from the working airstream. Some non-limiting examples of the separator include one or more cyclone separators, a filter screen, a foam filter, a HEPA filter, a filter bag, or combinations thereof. Optionally, a pre-motor filter 117 and/or a post-motor filter 119 can be provided as well (FIG. 3).

Additionally, the dry vacuuming robot 100 can include a beacon retainer 101 that can be configured to retrieve a beacon or secure a beacon to the dry vacuuming robot 100. The beacon retainer 101 can selectively release the beacon at a desired target location.

Figure 3:
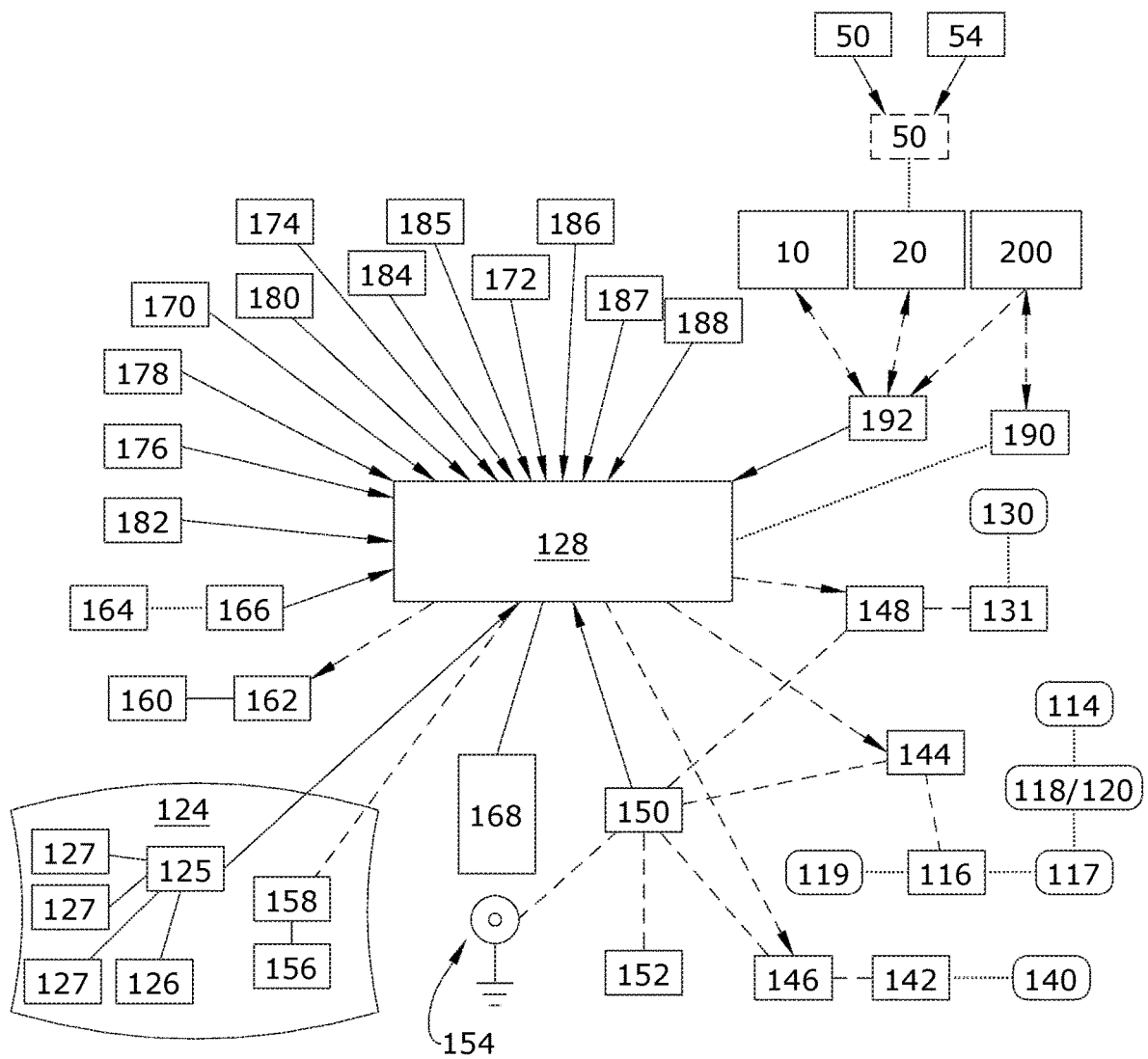
FIG. 3 is a schematic diagram of an autonomous vacuum cleaner of the system of FIG. 1 according to various aspects described herein.

Turning to FIG. 3, at least one agitator or brush 140 can be provided for agitating the surface to be cleaned. The brush 140 can be a brushroll mounted for rotation about a substantially horizontal axis, relative to the surface over which the unit moves. A drive assembly including a separate, dedicated brush motor 142 can be provided within the unit 112 to drive the brush 140. Alternatively, the brush 140 can be driven by the vacuum motor 116. Other embodiment of agitators are also possible, including one or more stationary or non-moving brush(es), or one or more brush(es) that rotate about a substantially vertical axis.

The drive system can include drive wheels 130 for driving the unit 112 across a surface to be cleaned. The drive wheels 130 can be operated by a common drive motor or individual drive motors 131 coupled with the drive wheels 130 by a transmission (not shown), which may include a gear train assembly or another suitable transmission. The drive system can receive inputs from the controller 128 for driving the unit 112 across a floor, based on inputs from the navigation/mapping system. The drive wheels 130 can be driven in in a forward or reverse direction in order to move the unit 112 forwardly or rearwardly. Furthermore, the drive wheels 130 can be operated simultaneously or individually in order to turn the unit 112 in a desired direction.

The controller 128 can receive input from the navigation/mapping system for directing the drive system to move the dry vacuuming robot 100 over the surface to be cleaned. The navigation/mapping system can include a memory 168 that stores maps for navigation and inputs from various sensors 132, 134 (FIG. 2), which is used to guide the movement of the dry vacuuming robot 100. For example, wheel encoders 172 can be placed on the drive shafts of the wheel motors 131, and are configured to measure the distance travelled. This measurement can be provided as input to the controller 128.

Motor drivers 144, 146, 148 can be provided for controlling the vacuum motor 116, brush motor 142, and wheel motors 131, respectively, and act as an interface between the controller 128 and the motors 116, 142, and 131. The motor drivers 144, 146, 148 may be an integrated circuit chip (IC). For the wheel motors 131, one motor driver 148 can control the motors 131 simultaneously or individually.

The motor drivers 144, 146, 148 for the vacuum motor 116, brush motor 142, and wheel motors 131 can be electrically coupled to a battery management system 150 which can include a rechargeable battery or battery pack 152. In one example, the battery pack 152 can include lithium ion batteries. Charging contacts for the battery pack 152 can be provided on the exterior of the unit 112. The docking station 10 for receiving the unit 112 for charging can be provided with corresponding charging contacts. In one example, the charging contacts provided on the dry vacuuming robot 100 can be an electrical connector such as a DC jack 154.

The controller 128 is further operably coupled with a user interface (UI) 124 for receiving inputs from a user. The user interface 124 can be used to select an operation cycle for the dry vacuuming robot 100 or otherwise control the operation of the dry vacuuming robot 100. The user interface 124 can have a display, such as an LED display 156, labeled indicator lights, or illuminated icons, for providing visual notifications to the user. Examples of visual notifications can include indications of operational status and diagnostic information such as battery 152 and/or filter life status, WiFi or Bluetooth connectivity status, and various error and fault codes. A display driver 158 can be provided for controlling the display 156, and acts as an interface between the controller 128 and the display 156. The display driver 158 may be an integrated circuit chip (IC).

The user interface 124 can further have one or more switch(es) 126, 127 that are actuated by the user to provide input to the controller 128 to control the operation of various components of the dry vacuuming robot 100. For example, one of the switches 126, 127 can be a suction power switch that can be selectively closed by the user to activate the vacuum motor 116. Another one of the switches 126, 127 can be coupled with a configurable display to select operating mode, set power level or runtime, input cleaning schedule, configure notifications, or input passwords, for example. A switch driver 125 can be provided for controlling the switches 126, 127, and acts as an interface between the controller 128 and the switches 126, 127.

The dry vacuuming robot 100 can further be provided with a speaker 160 for providing audible notifications to the user. Examples of audible notifications include announcements such as beeps, tones or a prerecorded voice. A speaker driver 162 can be provided for controlling the speaker 160, and acts as an interface between the controller 128 and the speaker 160. The speaker driver 162 may be an integrated circuit chip (IC).

The controller 128 can further be operably coupled with the various sensors 132, 134 (FIG. 2) for receiving input about the environment and can use the sensor input to control the operation of the dry vacuuming robot 100. The sensor input can further be stored in the memory 168 and/or used to develop maps for navigation, as previously described. Some exemplary sensors are illustrated in FIG. 3, although it is understood that not all sensors shown may be provided, additional sensors not shown may be provided, and that the sensors can be provided in any combination.

The dry vacuuming robot 100 can include a positioning or localization system having one or more sensor(s) for determining the position of the robot relative to objects and its location within an environment. The localization system can utilize visual odometry further comprising an imager 164 and an image processor 166 for capturing successive images of the environment and comparing the position of spatial objects or transition points on the images to determine the relative position of the dry vacuuming robot 100 within the environment. The localization system can further include one or more infrared (IR) obstacle sensors 170 for distance and position sensing. The obstacle sensors 170 can be mounted to the housing of the autonomous unit 112, such as in the front of the unit 112 to determine the distance to obstacles in front of the dry vacuuming robot 100. Input from the obstacle sensors 170 can be used to slow down and/or adjust the course of the unit 112 when objects are detected. Additional sensors can be incorporated into the positioning and localization system, such as at least one of, or a combination of, a camera, wheel encoder 172, laser rangefinder, or RF based time of flight sensor, for determining the position and location of the unit.

Bump sensors 174 can also be provided for determining front or side impacts to the unit 112. The bump sensors 174 may be integrated with a bumper on the housing of the unit 112. Output signals from the bump sensors 174 provide inputs to the controller 128 for selecting an obstacle avoidance algorithm.

In addition to the obstacle 170 and bump sensors 174, the localization system can include additional sensors, including a side wall sensor 176, one or more cliff sensor(s) 180, and/or an accelerometer 178. The side wall or wall following sensor 176 can be located near the side of the unit 112 and can include a side-facing optical position sensor that provides distance feedback and controls the unit 112 so that the unit 112 can follow near a wall without contacting the wall. The cliff sensors 180 can be bottom-facing optical position sensors that provide distance feedback and control the unit 112 so that the unit 112 can avoid excessive drops such as stairwells or ledges. In addition to optical sensors, the wall following 176 and cliff sensors 180 can be mechanical or ultrasonic sensors.

The accelerometer 178 can be an integrated inertial sensor located on the controller 128 and can be a nine-axis gyroscope or accelerometer to sense linear, rotational and magnetic field acceleration. The accelerometer 178 can use acceleration input data to calculate and communicate change in velocity and pose to the controller 128 for navigating the dry vacuuming robot 100 around the surface to be cleaned.

The dry vacuuming robot 100 can further include one or more lift-up sensor(s) 182, which detect when the unit 112 is lifted off the surface to be cleaned, such as when the user picks up the dry vacuuming robot 100. This information is provided as an input to the controller 128, which will halt operation of the vacuum motor 116, brush motor 142, and/or wheel motors 131. The lift-up sensors 182 may also detect when the unit 112 is in contact with the surface to be cleaned, such as when the user places the dry vacuuming robot 100 back on the ground; upon such input, the controller 128 may resume operation of the vacuum motor 116, brush motor 142, and/or wheel motors 131.

The dry vacuuming robot 100 can further include one or more sensor(s) 184 for detecting the presence of the dirt bin 118 and/or the filters. For example, one or more pressure sensor(s) for detecting the weight of the dirt bin 118 and/or the filters can be provided. This information is provided as an input to the controller 128, which may prevent operation of the dry vacuuming robot 100 until the dirt bin 118 and/or filters are properly installed. The controller 128 may also direct the display 156 or speaker 160 to provide a notification to the user that the dirt bin 118 and/or filters are missing.

The dry vacuuming robot 100 can further include one or more sensor(s) for detecting a condition of the surface to be cleaned, which can include detecting a stain. For example, the dry vacuuming robot can be provided with an infrared dirt sensor 185, a stain sensor 186, an odor sensor 187, and/or a wet mess sensor 188. In one example, an infrared (IR) dirt sensor 185 can comprise an IR emitter and an IR receiver positioned in the working air path for monitoring the relative amount of dirt entrained in the working airflow based on changes in the intensity of the IR signal received by the receiver. In another example, a stain sensor 186 can comprise one or more color spectrum image sensor(s) configured to monitor color change of the surface over an area. Optionally, the stain sensor 186 can include a light sensitive stain sensing system comprising an illumination element for emitting a range of wavelengths within the visible and non-visible, ultraviolet electromagnetic spectrum for illuminating stains that are visible and non-visible to the human eye. The light sensitive stain sensing system can further comprise a light reader for measuring reflectance values and transmitting that data to a processor, which may trigger one or more predefined response(s). A representative light sensitive stain sensor system is more fully disclosed in U.S. Pat. No. 8,719,998 to Huffman, which is included herein by reference in its entirety.

In yet another example, an odor sensor 187 can comprise a gas sensor, and sensing methods can be based on electrochemical reactions between airborne odor particles and the sensor 187. The electrochemical reactions can cause electrical variation within the sensor 187, which can comprise different materials such as a metal oxide semiconductor, polymer, carbon nanotubes, or moisture absorbing material. In one example, the gas sensor 187 can be configured to detect ammonia, hydrogen sulfide and methyl mercaptan (methanethiol). In still another example, a wet mess sensor 188 can be a humidity sensor, such as a capacitive relative humidity sensor or a resistive humidity sensor.

The floor condition sensors provide input to the controller 128, which may direct operation of the dry vacuuming robot 100 based on the condition of the surface to be cleaned, such as by selecting or modifying a cleaning cycle. Furthermore, the dry vacuuming robot 100 may mark the location of a detected stain and the mapping/navigation system can store the location of the stain in the memory 168. For example, a stain waypoint including the location of the stain relative to reference points such as the docking station 10 or the artificial barrier 20 can be stored in the memory 168.

The dry vacuuming robot 100 can further include one or more wireless radio(s) 190 operably coupled with the controller 128 and configured to communicate with other devices over a global, local, and/or personal area network, for example. In one example, the dry vacuuming robot 100 can share data, such as a room map or a stain waypoint with the deep cleaning robot 200 through the wireless radio 190. For instance, the wireless radio 190 can connect to a cloud server, and the cloud server can contact the deep cleaning robot 200 and transfer the room map or stain waypoint data via a global WiFi network. Alternatively, the wireless radio 190 can connect the dry vacuuming robot 100 to the deep cleaning robot 200 over a wireless personal area network, such as a Bluetooth, low energy connection.

The dry vacuuming robot 100 can further include one or more IR transceiver(s) 192 for communicating with peripheral devices such as the deep cleaning robot 200, docking station 10 and/or artificial barrier system 20 (described below). The one or more IR transceiver(s) 192 on the dry vacuuming robot 100 and corresponding transceivers on the associated peripheral device can be set up on a frequency based communication protocol such that each pair of associated IR transceivers 192 can be configured to transfer distinct code sets, which can comprise a variety of different instructions with predefined responses.

For example, the dry vacuuming robot 100 can communicate with the docking station via IR transceivers 192 during a robot homing process. The dry vacuuming robot 100 can initiate the homing process by turning on its IR transceivers 192 and searching for corresponding IR signals emitted by transceivers on the docking station 10 that can be used to guide the dry vacuuming robot 100 to the dock 10, such as by emitting signals to instruct the dry vacuuming robot 100 to maneuver left, right or straight towards the dock.

Figure 5:
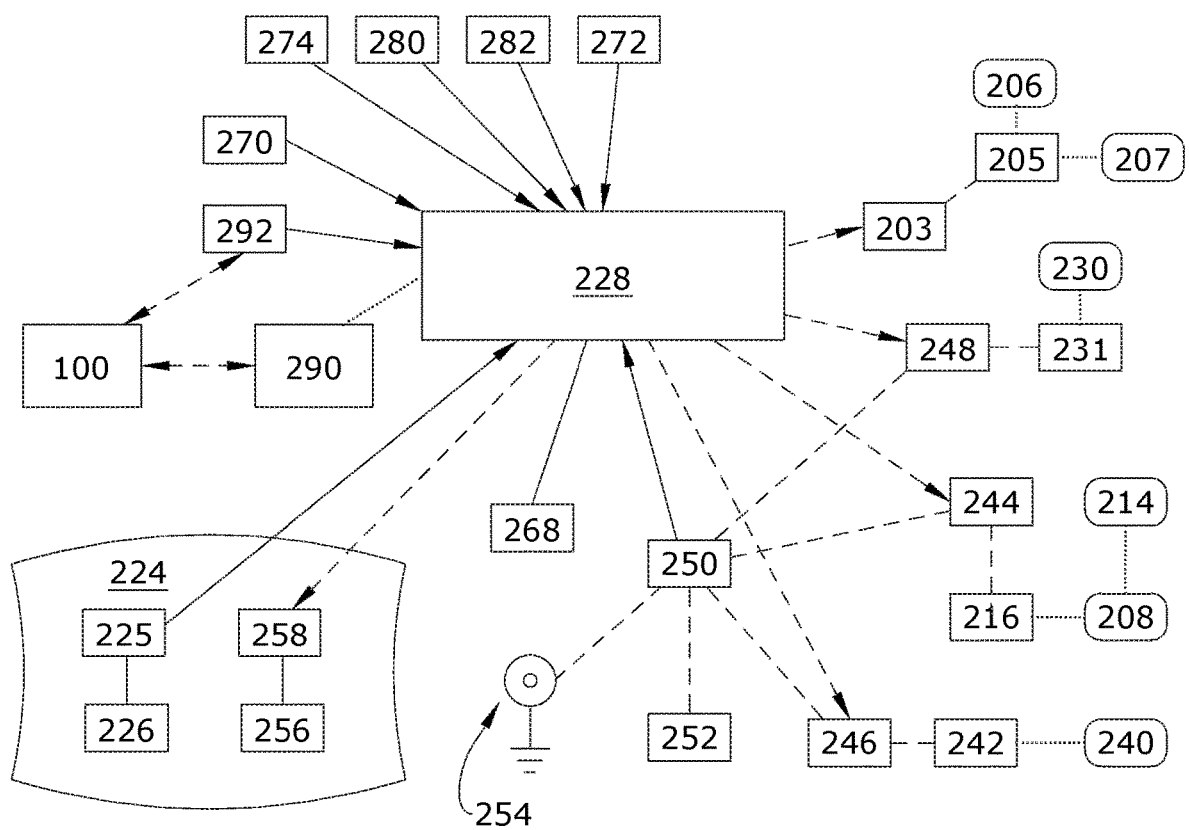
FIG. 5 is a schematic diagram of an autonomous deep cleaner of the system of FIG. 1 according to various aspects described herein.

In another example, the dry vacuuming robot 100 can communicate with the deep cleaning robot 200 via corresponding IR transceivers 192, 292 (FIG. 5). In this instance, the dry vacuuming robot 100 can emit an encoded signal to the deep cleaning robot 200 to instruct the deep cleaning robot 200 to follow the dry vacuuming robot 100 to a stain. The dry vacuuming robot 100 can then selectively emit signals for guiding the deep cleaning robot 200 to the stain such as for instructing the deep cleaning robot 200 to maneuver left, right, or straight towards the stain.

The artificial barrier system 20 can include an artificial barrier generator 50 that comprises a housing with at least one sonic receiver 52 for receiving a sonic signal from the dry vacuuming robot 100 and at least one IR transmitter 54 for emitting an encoded IR beam towards a predetermined direction for a predetermined period of time. The artificial barrier generator 50 can be battery-powered by rechargeable or non-rechargeable batteries. In one embodiment, the sonic receiver 52 can comprise a microphone configured to sense a predetermined threshold sound level, which corresponds with the sound level emitted by the dry vacuuming robot 100 when it is within a predetermined distance away from the artificial barrier generator 50. Optionally, the artificial barrier generator 50 can further comprise a plurality of IR emitters 54 near the base of the housing configured to emit a plurality of short field IR beams around the base of the artificial barrier generator 50 housing. The artificial barrier generator 50 can be configured to selectively emit one or more IR beam(s) for a predetermined period of time, but only after the microphone senses the threshold sound level, which indicates the dry vacuuming robot 100 is nearby. Thus, the artificial barrier generator 50 is able to conserve power by emitting IR beams only when dry vacuuming robot 100 is in the vicinity of the artificial barrier generator 50.

The dry vacuuming robot 100 can have a plurality of IR transceivers 192 around the perimeter of the unit 112 to sense the IR signals emitted from the artificial barrier generator 50 and output corresponding signals to the controller 128, which can adjust drive wheel control parameters to adjust the position of the dry vacuuming robot 100 to avoid the boundaries established by the artificial barrier 20 encoded IR beam and the short field IR beams. This prevents the dry vacuuming robot 100 from crossing the artificial barrier 20 boundary and/or colliding with the artificial barrier generator 50 housing.

In operation, sound emitted from the dry vacuuming robot 100 greater than a predetermined threshold sound level can be sensed by the microphone and triggers the artificial barrier generator 50 to emit one or more encoded IR beam(s) as described previously for a predetermined period of time. The IR transceivers 192 on the dry vacuuming robot 100 sense the IR beams and output signals to the controller 128, which then manipulates the drive system to adjust the position of the dry vacuuming robot 100 to avoid the border established by the artificial barrier system 20 while continuing to perform a cleaning operation on the surface to be cleaned.

Figure 4:
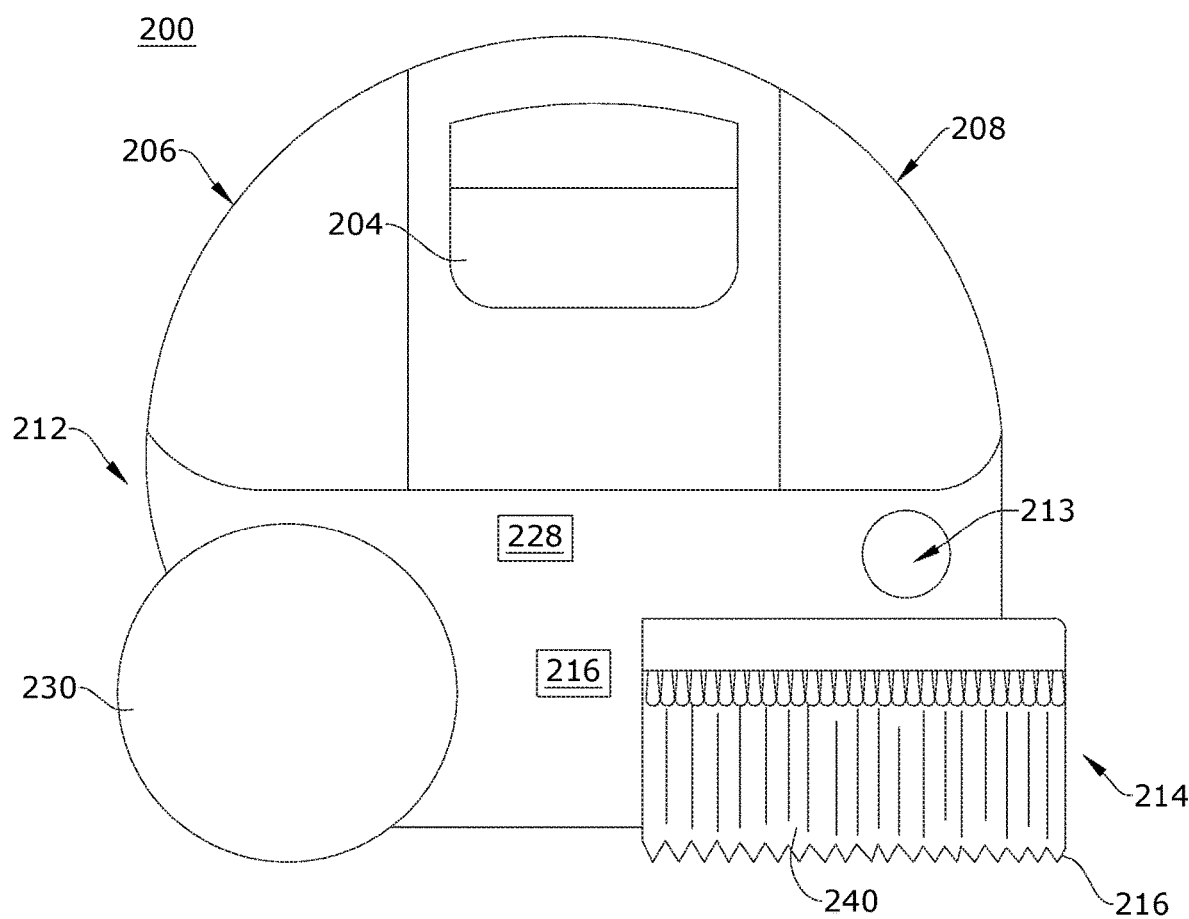
FIG. 4 is a schematic illustration of an autonomous deep cleaner of the system of FIG. 1 according to various aspects described herein.

FIG. 4 is a schematic view of the autonomous deep cleaner or deep cleaning robot 200 of the system 8 of FIG. 1. The deep cleaning robot 200 mounts the components of various functional systems of the deep cleaner in an autonomously moveable unit or housing 212, including components of a fluid supply system for storing cleaning fluid and delivering the cleaning fluid to the surface to be cleaned, a fluid recovery system for removing the cleaning fluid and debris from the surface to be cleaned and storing the recovered cleaning fluid and debris, and a drive system for autonomously moving the deep cleaning robot 200 over the surface to be cleaned. The moveable unit 212 can include a main housing adapted to selectively mount components of the systems to form the unitary movable device 212. The autonomous deep cleaner or deep cleaning robot can have similar properties to the autonomous deep cleaner or deep cleaning robot described in U.S. Pat. No. 7,320,149, published Jan. 22, 2008 and is incorporated herein by reference.

A controller 228 is operably coupled with the various function systems of deep cleaning robot 200 for controlling its operation. The controller 228 can be a microcontroller unit (MCU) that contains at least one central processing units (CPUs).

The deep cleaning robot 200 can include an RFID reader 213 for reading and interpreting signal from an RFID tag. The RFID reader can be mounted to the housing 212 of the deep cleaning robot 200 and can comprise one or more scanning antennas and a transceiver with a decoder to interpret data stored on an RFID tag. The scanning antenna is configured to emit a signal, such as radio waves, that communicates with an RFID tag, and can optionally provide electromagnetic energy to power the RFID tag.

The fluid delivery system can include a supply tank 206 for storing a supply of cleaning fluid and a fluid distributor in fluid communication with the supply tank 206 for depositing a cleaning fluid onto the surface. The cleaning fluid can be a liquid such as water or a cleaning solution specifically formulated for carpet or hard surface cleaning. Turning to FIG. 5, the fluid distributor can be one or more spray nozzle(s) 207 provided on the housing of the unit 212. Alternatively, the fluid distributor can be a manifold having multiple outlets. A pump motor 205 is provided in the fluid pathway between the supply tank 206 and the distributor 207 to control the flow of fluid to the distributor 207. Various combinations of optional components can be incorporated into the fluid delivery system as is commonly known in the art, such as a heater for heating the cleaning fluid before it is applied to the surface or one or more fluid control and/or mixing valve(s).

At least one agitator or brush 240 can be provided for agitating the surface to be cleaned onto which fluid has been dispensed. The brush 240 can be a brushroll mounted for rotation about a substantially horizontal axis, relative to the surface over which the unit 212 moves. A drive assembly including a separate, dedicated brush motor 242 can be provided within the unit 212 to drive the brush 240. Alternatively, the brush 240 can be driven by a vacuum motor. Other embodiments of agitators are also possible, including one or more stationary or non-moving brush(es), or one or more brush(es) that rotate about a substantially vertical axis.

The fluid recovery system can include an extraction path through the unit having an air inlet and an air outlet, an extraction or suction nozzle 214 which is positioned to confront the surface to be cleaned and defines the air inlet, a recovery tank 208 for receiving dirt and liquid removed from the surface for later disposal, and a suction source 216 in fluid communication with the suction nozzle 214 and the recovery tank 208 for generating a working air stream through the extraction path. The suction source 216 can be the vacuum motor carried by the unit 212, fluidly upstream of the air outlet, and can define a portion of the extraction path. The recovery tank 208 can also define a portion of the extraction path, and can comprise an air/liquid separator for separating liquid from the working airstream. Optionally, a pre-motor filter and/or a post-motor filter (not shown) can be provided as well.

While not shown, a squeegee can be provided on the housing of the unit, adjacent the suction nozzle 214, and is configured to contact the surface as the unit 212 moves across the surface to be cleaned. The squeegee can wipe residual liquid from the surface to be cleaned so that it can be drawn into the fluid recovery pathway via the suction nozzle 214, thereby leaving a moisture and streak-free finish on the surface to be cleaned.

The drive system can include drive wheels 230 for driving the unit 212 across a surface to be cleaned. The drive wheels 230 can be operated by a common drive motor or individual drive motors 231 coupled with the drive wheels 230 by a transmission (not shown), which may include a gear train assembly or another suitable transmission. The drive system can receive inputs from the controller 228 for driving the unit 212 across a floor, based on inputs from the dry vacuuming robot 100, as described in further detail below. The drive wheels 230 can be driven in in a forward or reverse direction in order to move the unit 212 forwardly or rearwardly. Furthermore, the drive wheels 230 can be operated simultaneously or individually in order to turn the unit 212 in a desired direction.

The controller 228 can receive input from the navigation/mapping system and/or the stain sensing system of the dry vacuuming robot 100 for directing the drive system to move the deep cleaning robot 200 over the surface to be cleaned. The deep cleaning robot 200 can include a memory 268 that stores inputs from the dry vacuuming robot 100 and various sensors on the deep cleaning robot 200, which is used to guide the movement of the deep cleaning robot 200. For example, wheel encoders 272 can be placed on the drive shafts of the wheel motors 231, and are configured to measure the distance travelled. This measurement can be provided as input to the controller 228.

Motor drivers 203, 246, 244, 248 can be provided for controlling the pump motor 205, brush motor 242, vacuum motor 216, and wheel motors 231 and acts as an interface between the controller and the motors. The motor drivers may be an integrated circuit chip (IC). For the wheel motors 231, one motor driver can controller the motors simultaneously.

The motor drivers 203, 246, 244, 248 for the pump motor 205, brush motor 242, vacuum motor 216, and wheel motors 231, respectively, can be electrically coupled to a battery management system 250 which can include a rechargeable battery or battery pack 252. In one example, the battery pack 252 can include lithium ion batteries. Charging contacts for the battery pack 252 can be provided on the exterior of the unit 212. The docking station 10 for receiving the unit 212 for charging can be provided with corresponding charging contacts. In one example, the battery pack 252 of the deep cleaning robot 200 can be removable and interchangeable with the battery pack 152 of the dry vacuuming robot 100. In another example, alternative or supplemental charging contacts can be provided on the deep cleaning robot 200 in the form of an electrical connector such as a DC jack 254 for recharging the battery pack 252 while the deep cleaning robot 200 is undocked.

The controller 228 is further operably coupled with a user interface 224 (UI) for receiving inputs from a user. The user interface 224 can be used to select an operation cycle for the deep cleaning robot 200 or otherwise control the operation of the deep cleaning robot 200. The user interface 224 can have a display 256, such as an LED display, labeled indicator lights, or illuminated icons for providing visual notifications to the user. Examples of visual notifications include indications of operational status and diagnostic information such as battery 252 and/or filter life status, fluid supply status, recovery tank level, WiFi or Bluetooth connectivity status, and various additional error and fault codes. A display driver 258 can be provided for controlling the display 256, and acts as an interface between the controller 228 and the display 256. The display driver 258 may be an integrated circuit chip (IC).

The user interface 224 can further have one or more switch(es) 226 that are actuated by the user to provide input to the controller 228 to control the operation of various components of the deep cleaning robot 200. For example, one of the switches 226 may be configured to return the deep cleaning robot 200 to the docking station 10, adjust flowrate or suction level, or pause operation, for example. A switch driver 225 can be provided for controlling the switch 226, and acts as an interface between the controller 228 and the switch 226.

The deep cleaning robot 200 can use the speaker 160 of the dry vacuuming robot (FIG. 3) to provide audible notifications to the user. Examples of audible notifications include announcements such as beeps, tones or a prerecorded voice. It is also possible that the deep cleaning robot 200 is be provided with its own speaker. Alternatively, the deep cleaning robot 200 and the dry vacuuming robot 100 can be wirelessly connected to a smart speaker device that includes a skill to enable the robots 100, 200 to communicate together as well as to communicate audible notifications to the user.

The controller 228 can further be operably coupled with various sensors for receiving input about the environment and can use the sensor input to control the operation of the deep cleaning robot 200. The sensor input can further be stored in the memory 268 and/or transmitted to the dry vacuuming robot 100. Some exemplary sensors are illustrated in FIG. 5, although it is understood that not all sensors shown may be provided, additional sensors not shown may be provided, and that the sensors can be provided in any combination.

The deep cleaning robot 200 can have fewer sensors than the dry vacuuming robot 100, since the deep cleaning robot 200 can use inputs from the sensors on the dry vacuuming robot 100 rather than generating its own inputs. Some of the sensors that are provided on the deep cleaning robot 200 can be part of a positioning or localization system determining the position of the deep cleaning robot 200 relative to objects. For example, the localization system can include one or more infrared (IR) obstacle sensor(s) 270 for distance and position sensing. The obstacle sensors 270 can be mounted to the housing of the autonomous unit 212, such as in the front of unit 212 to determine the distance to obstacles in front of the deep cleaning robot 200. Input from the obstacle sensors 270 can be used to slow down and/or adjust the course of the unit 212 when objects are detected.

Bump sensors 274 can also be provided for determining front or side impacts to the unit 212. The bump sensors 274 can be integrated with a bumper on the housing of the unit 212. Output signals from the bump sensors 274 provide inputs to the controller 228 for selecting an obstacle avoidance algorithm.

In addition to the obstacle 270 and bump 274 sensors, the localization system can optionally include additional sensors for providing input not already provided by sensors on the dry vacuuming robot 100, including one or more cliff sensor(s) 280 and/or lift-up sensor(s) 282. The cliff sensors 280 can be bottom-facing optical position sensors that provide distance feedback and control the unit 212 so that the unit 212 can avoid excessive drops such as stairwells or ledges. In addition to optical sensors, the cliff sensors 280 can be mechanical or ultrasonic sensors. The lift-up sensors 282 detect when the unit 212 is lifted off the surface to be cleaned, such as when the user picks up the deep cleaning robot 200. This information is provided as an input to the controller 228, which will halt operation of the pump motor 205, brush motor 242, vacuum motor 216, and wheel motors 231. The lift-up sensors may also detect when the unit is in contact with the surface to be cleaned, such as when the user places the robot back on the ground; upon such input, the controller may resume operation of the pump motor 205, brush motor 242, vacuum motor 216, and wheel motors 231. It is noted that additional sensors may also be provided, such as one or more side wall sensors or an accelerometer as described above for the dry vacuuming robot 100.

While not shown, the deep cleaning robot 200 can optionally include one or more sensor(s) for detecting the presence of the supply tank 206 and the recovery tank 208. For example, one or more pressure sensor(s) for detecting the weight of the supply tank 206 and the recovery tank 208 can be provided. This information is provided as an input to the controller 228, which can prevent operation of the deep cleaning robot 200 until the supply tank 206 and recovery tank 208 are properly installed. The controller 228 may also direct the display 256 to provide a notification to the user that the supply tank 206 or recovery tank 208 is missing.

The deep cleaning robot 200 can further include one or more wireless radio(s) 290 operably coupled with the controller 228 and configured to communicate with other devices over a wireless global, local, and/or personal area network, such as a Bluetooth connection, for example. In one example, the deep cleaning robot 200 can receive data from the dry vacuuming robot 100, such as a full or partial room map, a stain waypoint, status, results, cleaning schedule, and/or other instructions for maneuvering to a desired location, through the wireless radio 290.

The deep cleaning robot 200 can further include one or more IR transceiver(s) 292 for communicating with peripheral devices such as the dry vacuuming robot 100, docking station 10 and/or artificial barrier system 20. The one or more IR transceiver(s) 292 on the deep cleaning robot 200 and corresponding transceivers (i.e. IR transceivers 192) on the associated peripheral device (i.e. the dry vacuuming robot 100) can be set up on a frequency based communication protocol such that each pair of associated IR transceivers 292, 192 can be configured to transfer distinct code sets, which can comprise a variety of different instructions with predefined responses. For example, the corresponding pairs of IR transceivers 292, 192 can be configured to guide the deep cleaning robot 200 to the docking station 10 or to a specific location for cleaning a stain, to confine the deep cleaning robot 200 within a specified area, or enable the deep cleaning robot 200 to follow the dry vacuuming robot 100 to a desired location.

Figure 6:
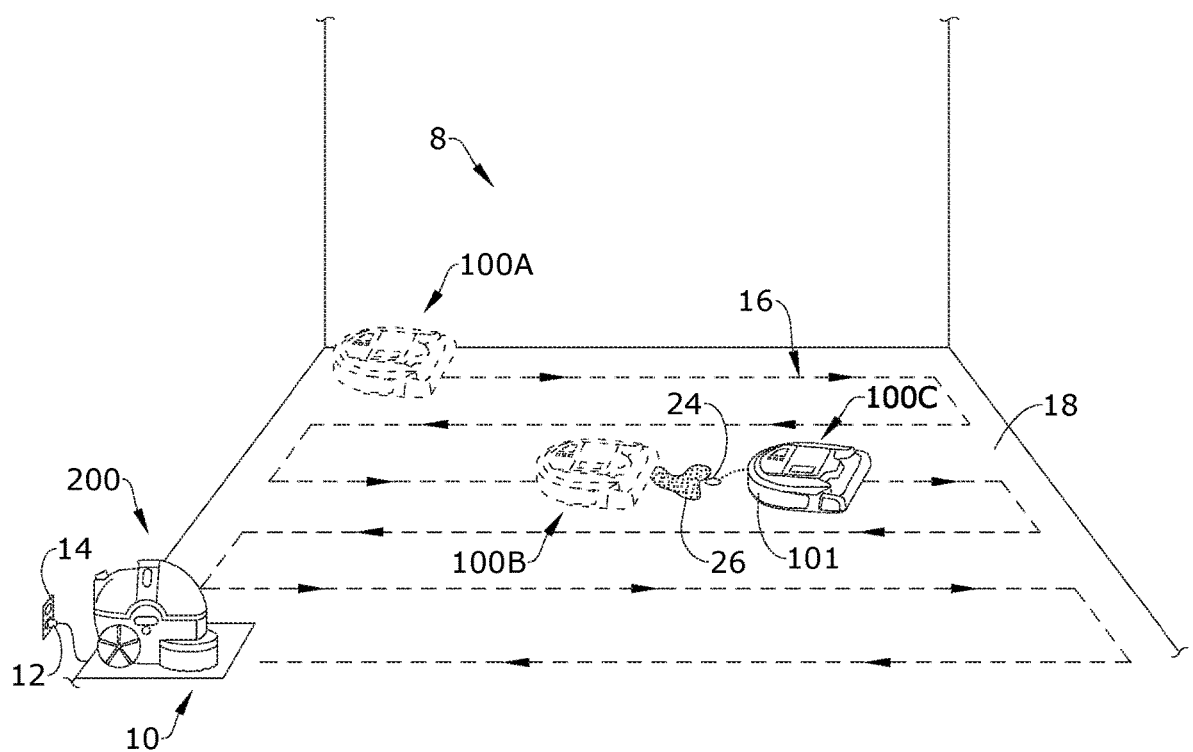
FIG. 6 is a perspective illustration of a method of operation according to various aspects described herein.

FIG. 6 is a schematic view depicting a method of operation using the system 8. The method can begin with the operation of the dry vacuuming robot 100 to vacuum clean a floor surface 18. For example, the dry vacuuming robot 100 may traverse a first path 16 on the floor surface 18, it may begin as illustrated in position 100A.

The dry vacuuming robot 100 can include the stain sensing system for detecting a stain 26 while traveling along the first path 16. For example, the dry vacuuming robot 100 may detect at least one stain 26 on the floor surface 18 using one or more of the floor condition sensor(s), including the IR dirt sensor 185, stain sensor 186, odor sensor 187, and/or wet mess sensor 188 (FIG. 3). Such a detection position is illustrated at position 100B. The exemplary sensors can detect the size and/or shape of the stain 26, the type of stain 26 (ex: food, wine, red dye, soil, or pet or other organic stain) and also the floor surface 18 type (ex: carpet, tile, hardwood, linoleum, etc.). Examples of floor condition sensors are disclosed in U.S. Pat. Nos. 5,613,261, 8,719,998, WO2017/032718A1, and WO2017/016813A1, all of which are incorporated herein by reference in their entirety.

The dry vacuuming robot 100 can include the navigation system configured for guiding movement of the deep cleaning robot 200 to the stain 26 along a path that is distinct from the first path 16. A path distinct from the first path 16 can include a path that includes a different route or course than the first path 16. For example, the dry vacuuming robot 100 can communicate the information about the stain 26 and floor surface 18 to the deep cleaning robot 200 via the wireless radios 190 (FIG. 3), 290 (FIG. 5). Alternatively, the dry vacuuming robot 100 can use the information about the stain 26 and floor surface 18 to determine a cleaning cycle appropriate for the stain 26, and can send instructions to the deep cleaning robot 200 to carry out the cleaning cycle via the wireless radios 190, 290. Further still, a path distinct from the first path 16 can include a path that is the same as the first path but occurs at a different time such that the deep cleaning robot 200 does not merely follow behind the dry vacuuming robot 100. It is contemplated that the deep cleaning robot 200 can be guided along a path that is distinct from the path taken by the dry vacuuming robot 100 in both time, route, starting destination, waypoints along the course, etc.

The dry vacuuming robot 100 can also mark the location of the stain. For example, the dry vacuuming robot 100 can remain at or near the stain 26 and instruct the deep cleaning robot to 200 maneuver to that location.

In another example, the dry vacuuming robot 100 can deploy a reusable physical marker, such as a wireless beacon 24, on or near the stain 26 to mark its location, which the deep cleaning robot 200 can use to locate the stain 26 for eventual deep cleaning. This has been illustrated in FIG. 6. The beacon 24 can be operably coupled to the deep cleaning robot 200 controller 228 such that the beacon 24 can guide the deep cleaning robot 200 to the location of the stain 26.

In one example, the beacon 24 can emit a signal such as radio-frequency (RF) signals, which may be omnidirectional or directed signals, for guiding the deep cleaning robot 200 to the target location. Alternatively, the beacon 24 can emit pulsed light signals, which can comprise wavelengths in the visible or near-visible electromagnetic spectrum, for guiding the deep cleaning robot 200 to the target location.

In one example, the wireless beacon 24 can comprise a radio-frequency identification (RFID) tag (not shown) for transmitting a signal, and the deep cleaning robot 200 RFID reader 213 (FIG. 4) can read and interpret the signal from the RFID tag. The RFID reader can use the signal from the RFID tag to monitor the position of the RFID tag and to guide the deep cleaning robot 200 to the target location marked by the beacon 24. Alternatively, the dry vacuuming cleaning robot 100 can comprise an RFID reader and the dry vacuuming robot 100 can guide the deep cleaning robot 200 to the target location marked by the beacon 24 via wireless radios 190, 290.

The RFID tag can comprise a transponder with an integrated circuit and an antenna for receiving electromagnetic energy from signals emitted by the RFID reader 213 and for transmitting signals back to the reader 213. The RFID tag can be attached or molded into a substrate such as a plastic chip or Mylar film, for example. The RFID tag can further comprise a passive or active configuration. An active RFID tag contains an on-board power source such as a battery, whereas a passive RFID tag does not include a power source and instead harvests power from electromagnetic fields emitted by the scanning antenna(s) of the RFID tag reader 213. The primary difference between an active and passive RFID tag is the signal broadcast range. The signal broadcast range for an active RFID tag can generally range from about 100-300 feet; much larger than the typical range for a passive RFID tag, which is approximately up to 20 feet.

The dry vacuuming robot 100 can further comprise a deployment system for deploying the beacon 24 at a target location. The beacon deployment system can store one or more beacons 24 on the dry vacuuming robot 100, and can selectively deploy a beacon 24 at a target location, such as at the stain 26. The deployment system can comprise the beacon retainer 101 (FIG. 2), which can be configured to retrieve an already deployed beacon 24 or secure a beacon to the dry vacuuming robot and can selectively release the beacon at a desired target location. The retainer 101 can comprise a mechanical coupling, such as a hook, clamp, or magnetic coupling, for example. Some examples of beacon deployment systems are discussed below with reference to FIGS. 11-13.

Alternatively, the location of the stain 26 along with other environmental features such as location of walls 19 and objects, temperature, floor type, etc., can be stored relative to an internal coordinate system built from the dry vacuuming robot starting position.

After the dry vacuuming robot 100 marks the location of the stain 26, the deep cleaning robot 200 is led to the stain 26. For example, if the dry vacuuming robot 100 marks the location of the stain 26 by remaining at the stain, the dry vacuuming robot 100 can emit an infrared signal that the deep cleaning robot 200 can follow using an infrared signal-follow algorithm stored in the memory 268 of the deep cleaning robot 200.

Figure 7:
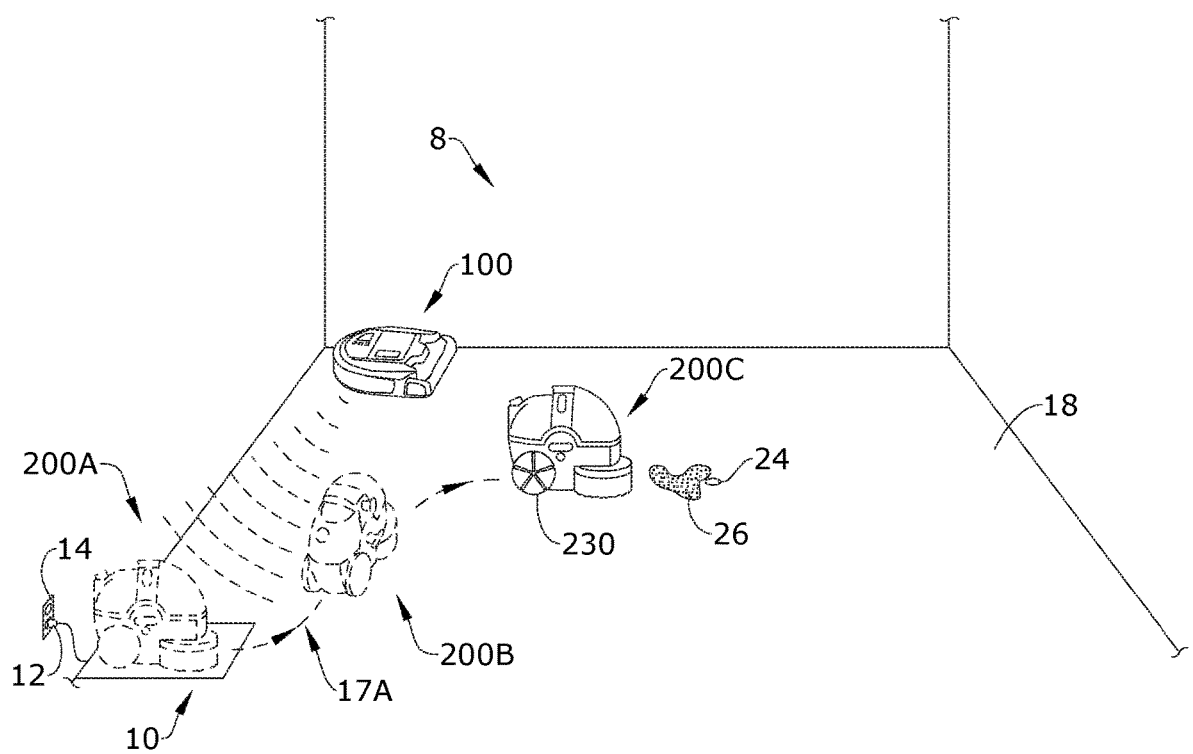
FIG. 7 is a perspective illustration of a method of operation according to various aspects described herein.

Turning to FIG. 7, if the dry vacuuming robot 100 has deployed the beacon 24, such as a passive RFID tag for example, the dry vacuuming robot 100 can communicate with the deep cleaning robot 200, instructing it to travel to the beacon 24, as illustrated by path 17A, which is distinct from path 16, and perform a predetermined deep cleaning operation. Electromagnetic fields emitted by the deep cleaning robot's RFID reader 213 power up the RFID tag of the beacon 24, which can then emit a signal back to the RFID reader 213 of the deep cleaning robot 200. The RFID reader 213 receives and interprets the signal and provides location information to the controller 228 of the deep cleaning robot 200, which then directs the deep cleaning robot 200 to the location of the beacon 24.

In another example, if the dry vacuuming robot 100 has saved the location of the stain to 26 its memory 168, the dry vacuuming robot 100 can send, or emit, a series of navigation instructions, or directions, to the deep cleaning robot 200 for the deep cleaning robot 200 to guide the movement of the deep cleaning robot to travel to the stain (i.e. forward for 4 wheel revolutions, left turn 30 degrees, forward for 8 wheel revolutions, stop). The deep cleaning robot 200 can receive the directions while at the docking station 10. Alternatively, instead of providing a set of fixed instructions, the dry vacuuming robot 100 can monitor the location of the deep cleaning robot 200 and provide dynamic navigation instructions (i.e. go forward, turn right, go forward, slow down, stop).

Figure 8:
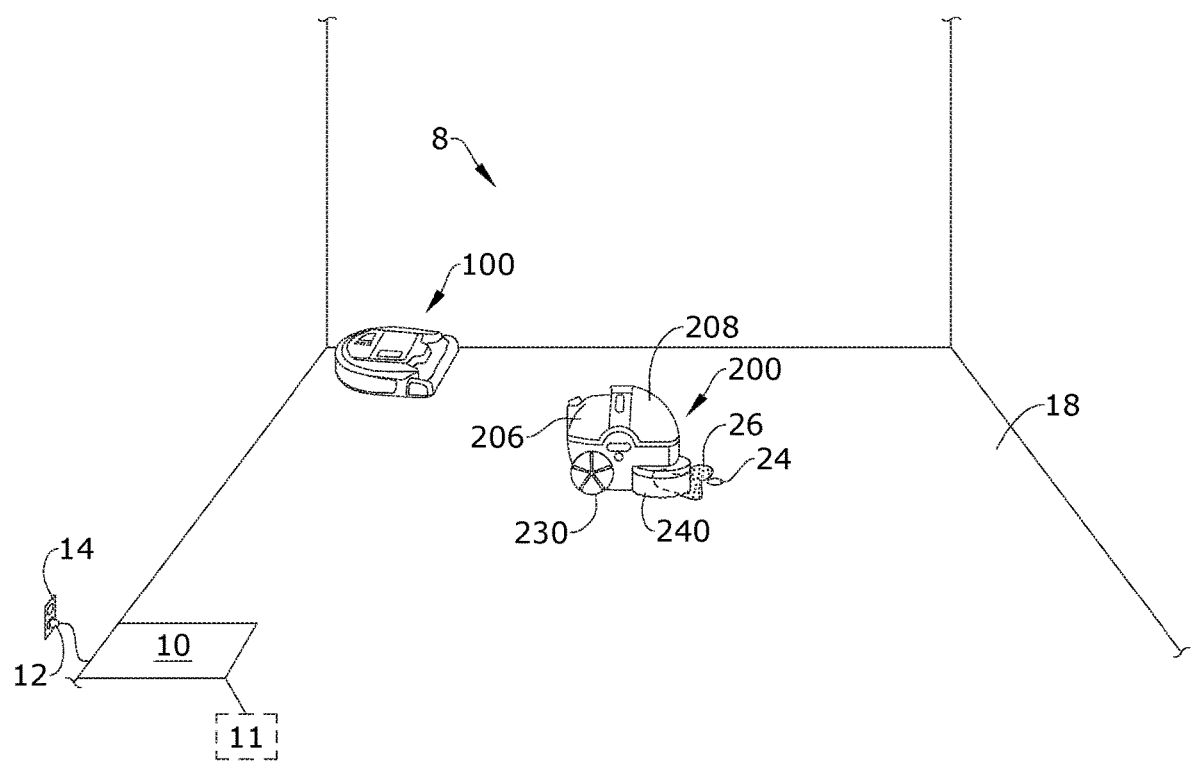
FIG. 8 is perspective illustration of a method of operation according to various aspects described herein.

Once at the stain, as illustrated in FIG. 8, the deep cleaning robot 200 can perform the cycle of operation sent by the dry vacuuming robot 100. The cycle of operation can include a particular movement pattern, solution amount, solution dwell time, brush operation time, and/or extraction time that is appropriate for the stain 26. Examples of movement patterns include: (a) a circular pattern about a set point between the wheels 230; (b) an outward increasing spiral pattern with an optional overlap between passes to achieve a desired coverage diameter; (c) a straight forward/back pattern, with an optional overlap between passes to achieve a desired coverage width; (d) a forward/back pattern moving transversely around a circle; and (e) any combination of the preceding patterns. The movement pattern can also have one or more period(s) of no movement to let the cleaning fluid dwell on the stain 26 for a period of time.

As the deep cleaning robot 200 is executing the movement pattern, the spray, extraction, and brush features can selectively be engaged according to the cycle of operation. As an example, the cleaning pattern can be spray and brush first, followed by a dwell time, followed by extraction. Brush speed and spray flow rate can further be selectively adjusted throughout the cleaning cycle.

Alternatively, the deep cleaning robot 200 can use the information about the stain 26 and floor surface 18 type determined by the dry vacuuming robot 100 to clean the stain 26 accordingly. For example, the deep cleaning robot 200 can select a particular movement pattern, solution amount, solution dwell time, brush operation time, and/or extraction time that is appropriate for the stain 26 and floor surface 18 type.

During operation of the dry vacuuming robot 100, the dry vacuuming robot 100 may detect, or locate, more than one stain on the floor surface 18. The dry vacuuming robot 100 can be configured to deploy a set of beacons 24 for multiple stains 26. The system 8 can be configured to deploy the deep cleaning robot 200 to treat each stain 26 as one is located, or a compiled list of stains 26 can be logged by the dry vacuuming robot 100, and once dry vacuuming is complete, the deep cleaning robot 200 can be deployed to treat each stain 26 in a sequential order.

It is noted that the user can have the option of using the deep cleaning robot 200 alone to treat a stain 26. For example, a user may identify a stain 26 without using the dry vacuuming robot 100, and may carry the deep cleaning robot 200 to the stain 26 and initiate a cleaning cycle to treat the stain 26. In another embodiment, the user can lead the deep cleaning robot 200 to a stain 26 using an IR pointer (not shown) that emits an infrared signal that the deep cleaning robot 200 can follow using an infrared signal-follow algorithm stored in the memory 268 of the deep cleaning robot 200. In yet another example, the user can send or otherwise input navigation instructions to the deep cleaning robot 200 to travel to the stain 26.

Figure 9:
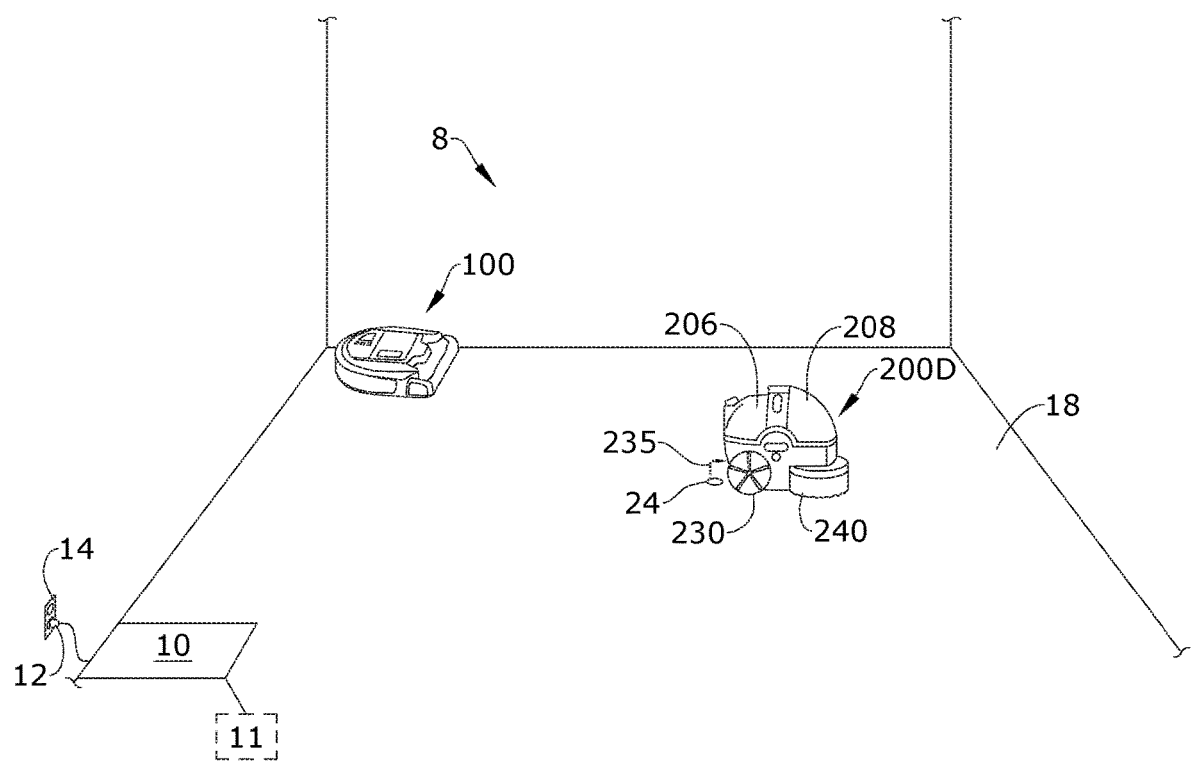
FIG. 9 is a perspective illustration of a method of operation according to various aspects described herein.

Turning to FIG. 9, the deep cleaning robot 200 can be configured to retrieve the beacon 24. For example, the deep cleaning robot 200 can include a beacon retainer 235 that is configured to retrieve the beacon 24. The retainer 235 can comprise a mechanical coupling, such as a hook, clamp, or magnetic coupling, for example. The deep cleaning robot 200 can retrieve the beacon 24 upon completion of a cleaning cycle to treat the stain 26 as illustrated in position 200D. Alternatively, the deep cleaning robot 200 can retrieve the beacon 24 prior to completion of a cleaning cycle to treat the stain 26. Alternatively, the dry vacuuming robot 100 can retrieve the beacon 24 instead of the deep cleaning robot 200. For example, the dry vacuuming robot 100 can retrieve the beacon 24 while the deep cleaning robot 200 completes the cleaning cycle of operation to treat the stain 26. As previously described, the beacon deployment system of the dry vacuuming robot 100 can be configured to retrieve an already deployed beacon 24.

Figure 10:
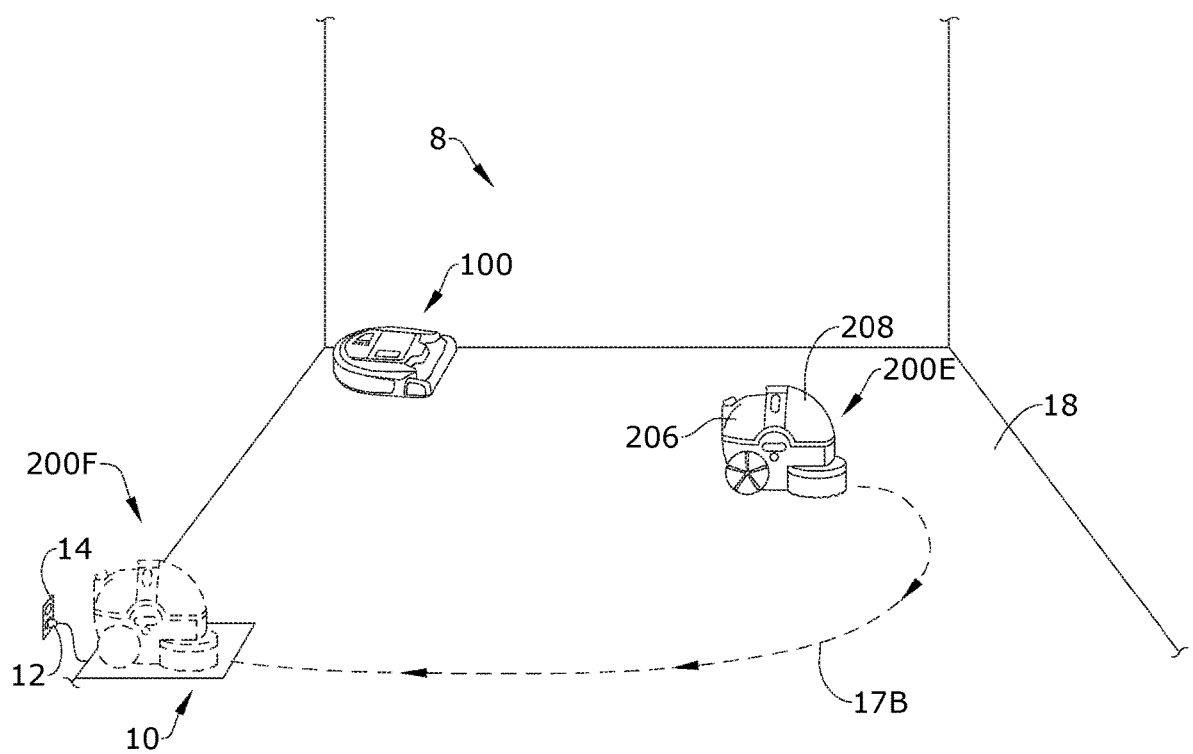
FIG. 10 is a perspective illustration of a method of operation according to various aspects described herein.

FIG. 10 is a schematic illustration of the deep cleaning robot 200E returning to the dock 10 upon completion of a cleaning cycle in a robot homing process, as illustrated in path 17B. The controller 228 (FIG. 5) can receive input from the navigation/mapping system and/or the stain sensing system of the dry vacuuming robot 100 for directing the drive system to move the deep cleaning robot 200E to the dock 10, such that the deep cleaning robot is in a docked position 200F. Alternatively, the deep cleaning robot 200 memory 268 (FIG. 5) can store inputs from the dry vacuuming robot 100 and various sensors on the deep cleaning robot 200, to guide the deep cleaning robot 200 to the dock 10. It is also possible for the robot 200 to turn on its IR transceivers 292 (FIG. 5) and search for corresponding IR signals emitted by transceivers 11 (FIG. 9) on the docking station 10 that can be used to guide the deep cleaning robot 200 to docking position 200F, such as by emitting signals to instruct the deep cleaning robot 200 to maneuver left, right or straight towards the dock 10.

Figure 11A:
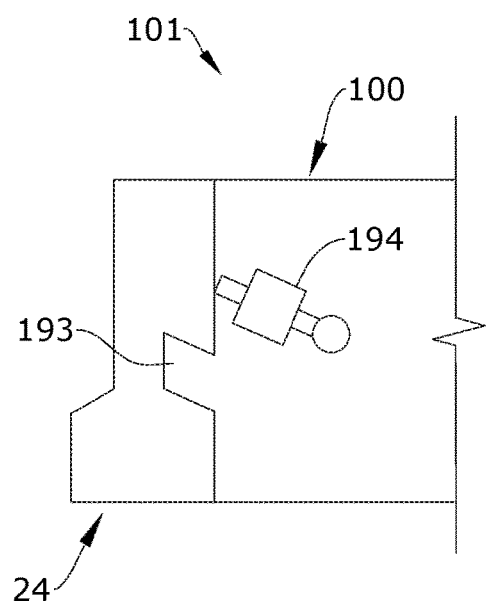
FIG. 11A is a schematic illustration of a beacon deployment system for the dry vacuuming robot, with the beacon in a retained position.
Figure 11B:
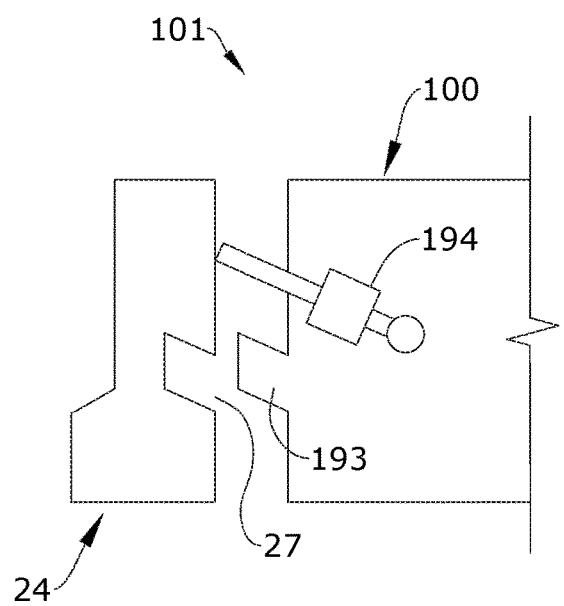
FIG. 11B is a schematic illustration of the beacon deployment system of FIG. 11A for the dry vacuuming robot, with the beacon in a released position.

FIG. 11A is a schematic illustration of one example of a beacon deployment system for the dry vacuuming robot 100. In FIG. 11A, the retainer 101 (FIG. 2) can comprise a hook 193 on the dry vacuuming robot 100 that is configured to catch a corresponding recess, or slot 27, formed in the beacon 24. FIG. 11A illustrates the beacon in a retained position. An actuator, such as a solenoid piston 194, can be configured to selectively push or drop the beacon 24 off the hook 193 and onto a target location, which is illustrated in FIG. 11B. The target location can include on, or near the stain 26 (FIG. 6).

Figure 12:
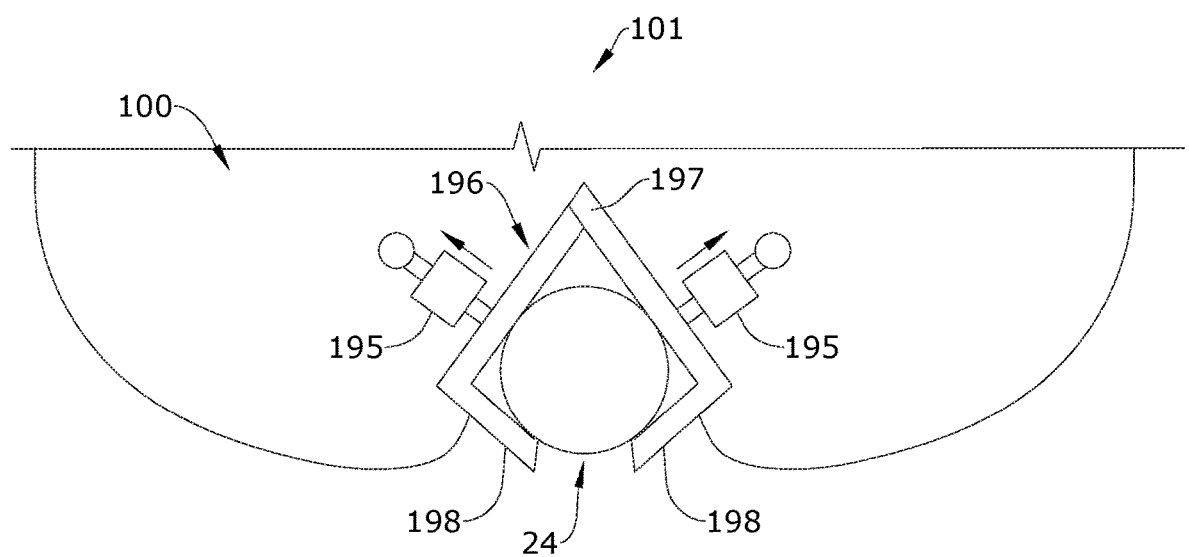
FIG. 12 is a schematic top view of a beacon deployment system for the dry vacuuming robot according to various aspects described herein.

FIG. 12 is a schematic illustration of another example of a beacon deployment system for the dry vacuuming robot 100. In FIG. 12, the retainer 101 (FIG. 2) can comprise a clamp 196, further comprising a pair of arms 198 pivotally mounted to the housing 112 of the dry vacuuming robot 100 and configured to selectively clamp and unclamp the beacon 24. The arms 198 can be mounted to a vertically oriented pivot pin 197 and operably connected to solenoid actuators 195 configured to pivot the arms 198 inwardly to clamp the beacon 24 and outwardly to release and deploy the beacon 24.

Figure 13:
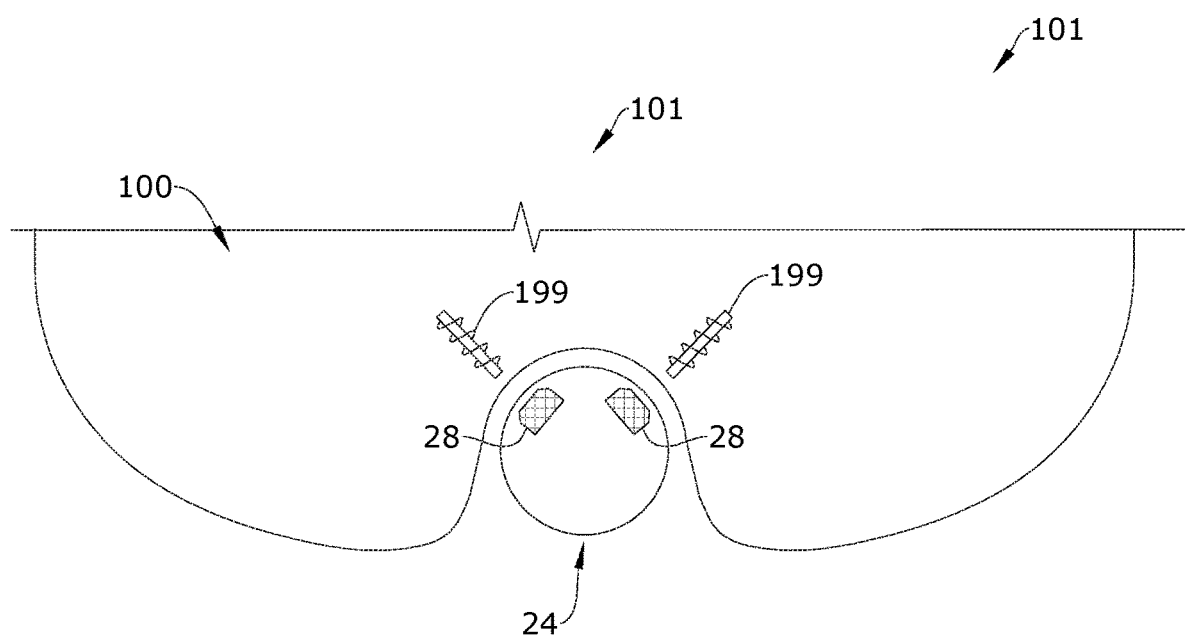
FIG. 13 is a schematic illustration of a beacon deployment system for the dry vacuuming robot according to various aspects described herein.

FIG. 13 is a schematic illustration of another example of a beacon deployment system for the dry vacuuming robot 100. In FIG. 13, the retainer 101 (FIG. 2) can comprise a magnetic coupling on the dry vacuuming robot 100 configured to attract and retain a magnetized beacon 24 having one or more magnets 28, and to selectively repel the beacon 24 to deploy it at a target location. In one configuration, the magnetic coupling on the dry vacuuming robot can comprise one or more electromagnets 199 configured to selectively reverse polarity to repel and deploy the magnetized beacon 24.

Figure 14:
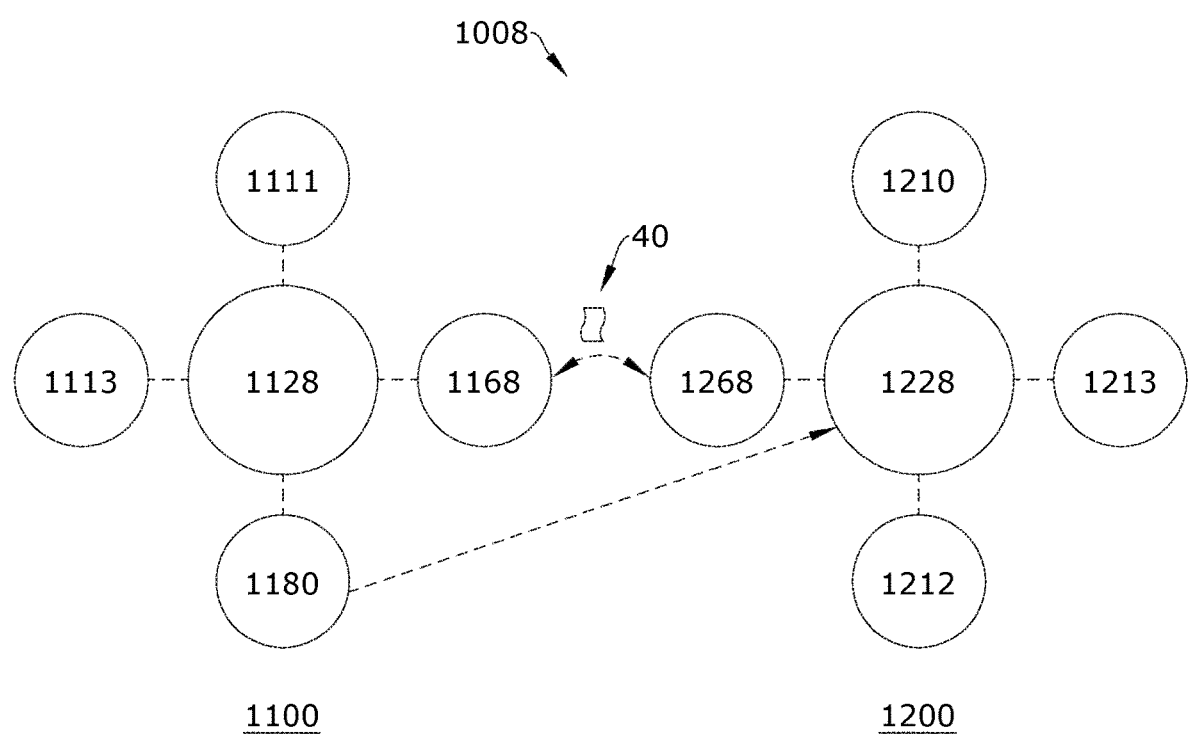
FIG. 14 is a schematic of an autonomous floor cleaning system according to various aspects described herein.

FIG. 14 is a schematic illustration of another example of an autonomous floor cleaning system according to various aspects described herein. The system can be substantially identical to the system 8, except that in the present example, a deep cleaning robot 2200 is provided with a navigation/mapping system 2268, which may be substantially identical to the navigation/mapping system 168 described for the dry vacuuming robot 100. As previously described, a dry vacuuming robot 1100 includes a controller 1128 that can receive input from and control various components of the dry vacuuming robot 1100, such as a vacuum collection system 1111, a drive system 1113, and a navigation/mapping system 1168. Likewise, the deep cleaning robot 2200 includes a controller 2228 that can receive input from and control various components of the deep cleaning robot 2200, such as a fluid supply system 2210, a drive system 2213, and a fluid recovery system 2212. In this example, the dry vacuuming robot 1100 can generate and share a map 40 to one or more stain location(s) with the deep cleaning robot 2000. Stain detection can still be performed by the dry vacuuming robot 1000, and stain/floor information detected by a stain sensing system 1186 may be transferred from the dry vacuuming cleaner 1100 to the deep cleaning robot 2200 as previously described. Here, the dry vacuuming robot 1100 can send the map 40, or stain waypoint, to the deep cleaning robot 2200 and the deep cleaning robot 2200 can guide itself to the stain location(s). While not shown, the docking station 10 and artificial barrier 20 may be included in the system 8.

Figure 15:
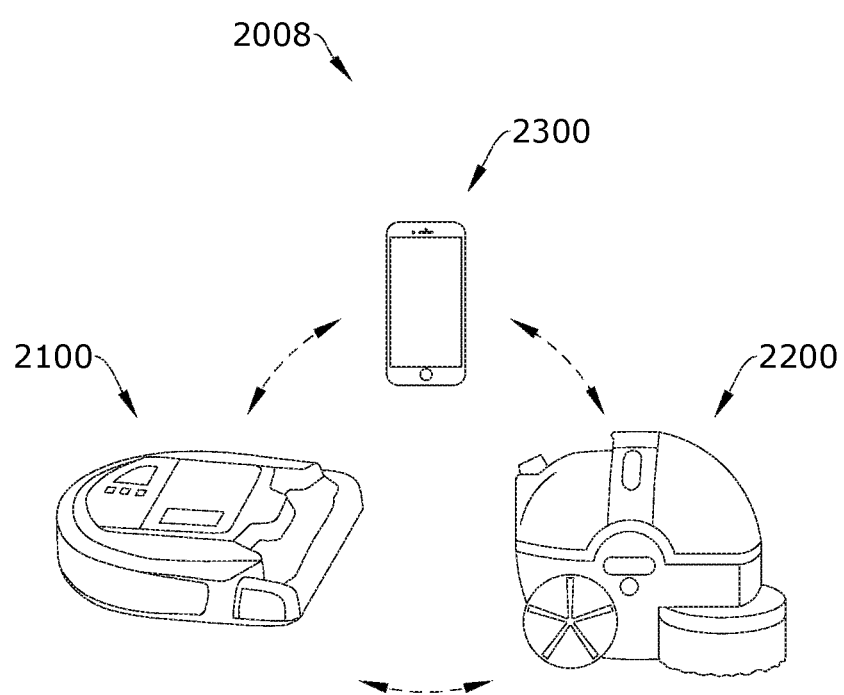
FIG. 15 is a schematic of an autonomous floor cleaning system according to various aspects described herein.

FIG. 15 is a schematic illustration of another example of an autonomous floor cleaning system 2008 according to various aspects described herein. The system 2008 may be substantially identical to the system 8, except that the system includes a personal communication device 2300 in communication with one or both of a dry vacuuming robot 2100 and a deep cleaning robot 2200. The personal communication device 2300 can include, but is not limited to, a mobile communication device such as a smart phone or tablet, or a personal computer such as a laptop. While not shown, the docking station 10 and artificial barrier 20 may be included in the system 2008.

In one example, the communication device 2300 can include a software program or app that contains a map of the user's floor. The map can be generated by the dry vacuuming robot 2100 using a dead reckoning process, bump sensor impacts, a long range distance sensing process, triangulation, or any combination thereof. Via the app, the user can select locations to be cleaned by one or both of the robots 2100, 2200, and may further input information or make selections regarding the cleaning cycle to be implemented.

In another example in which the communication device 2300 includes a camera, the user can take an image of a stain 26 (FIG. 6) on the floor surface 18 and the app can use the image to control one or both of the robots 2100, 2200 to clean the stain 26. The app can further be configured to locate the communication device 2300 relative to the map, and can target the stain 26 when the communication device 2300 is held above the stain 26. The app can be configured to allow the user to sketch the boundary of the stain 26 in the image, which can help the app determine the exact location and size of the stain 26.

In yet another example, the communication device 2300 can be coupled with a sensor on another consumer product, such as an upright vacuum cleaner, and the sensor can provide stain information to the communication device 2300, which in turn can send the information to the deep cleaning robot 200 to treat stains.

In still another example, the communication device 2300 can be coupled with a dry vacuuming robot 2100 and the deep cleaning robot 2200. The dry vacuuming robot 2100 can transmit stain information, including for example a stain waypoint stored in the map 40, detected by a stain sensing system 1186 to the communication device 2300. A user can then determine whether to take further action, such as deploying the deep cleaning robot 2200 to the stain, or manually cleaning the stain, for example.

Figure 16:
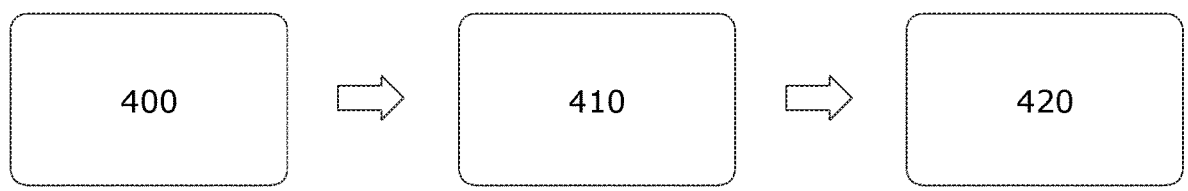
FIG. 16 is a flow chart depicting a method of operation using the floor cleaning system according to various aspects described herein.

FIG. 16 is a flow chart depicting another example of a method of operation using the system 8. The dry vacuuming robot 100 can be configured to detect an abnormality, such as a wet spot or liquid spill, a color change, an odor change, or a heavily soiled area on the floor surface 18. Because the dry vacuuming robot 100 is not configured to collect liquid, suctioning up liquid has the potential to damage the vacuum motor 116. During operation 400, if the dry vacuuming robot 100 detects such an abnormality 410, the deep cleaning robot 200 can be deployed to take appropriate action 420. In the case of a liquid spill, this may include suctioning up the liquid via the suction inlet 214 to clear the way for the dry vacuuming robot 100 to resume its operation. The deployment of the deep cleaning robot 200 to address an abnormality can be substantially similar to any example of the deployment of the deep cleaning robot 2000 to treat a stain, as described above.

Benefits of aspects described herein can include an autonomous floor cleaning system where a primary robot comprises full mapping, navigation, and stain sensing technology and hardware. A secondary robot however, can be a less intelligent robot without those features, and instead is configured to leverage the mapping, navigation, and stain sensing of the primary robot. This offers an advantageous autonomous floor cleaning system with a greater range of cleaning capabilities, while avoiding duplication of certain components, and therefore provides a lower cost solution compared to two full-feature robots.

While various embodiments illustrated herein show an autonomous or robotic cleaner, aspects of the invention may be used on other types of floor cleaners, including non-autonomous cleaners. For example, the dry vacuuming cleaner could be embodied as a non-autonomous vacuum cleaner that is used to locate and detect stains, where the deep cleaning robot is selectively deployed when a stain is detected as a user is vacuuming.

To the extent not already described, the different features and structures of the various embodiments of the robots may be used in combination with each other as desired. That one feature may not be illustrated in all of the embodiments is not meant to be construed that it cannot be, but is done for brevity of description. Thus, the various features of the different embodiments of the robots may be mixed and matched as desired to form new embodiments, whether or not the new embodiments are expressly described. For example, the deep cleaning robot can be the primary, more intelligent robot and the dry vacuuming robot can be the secondary, less intelligent robot.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. An autonomous floor cleaning system, comprising:
    a dry vacuuming robot for generating a working airflow for removing dirt from a surface to be cleaned and storing the dirt in a collection space, the dry vacuuming robot further comprising:
        a drive system for autonomously moving the dry vacuuming robot over the surface to be cleaned;
        a stain sensing system for detecting a stain; and
        a beacon deployment system for storing one or more beacons on the dry vacuuming robot and selectively deploying a beacon at a location of the stain, the beacon deployment system comprises a beacon retainer comprising electromagnets configured to selectively reverse polarity of magnets on the beacon to repel the beacon to secure and selectively release a beacon;
    a deep cleaning robot for storing a cleaning fluid and delivering the cleaning fluid to the surface to be cleaned, and for removing the cleaning fluid and debris from the surface to be cleaned and storing the recovered cleaning fluid and debris, the deep cleaning robot further comprising:
        a controller for controlling the operation of the deep cleaning robot; and
        a drive system for autonomously moving the deep cleaning robot over the surface to be cleaned based on inputs from the controller; and
    wherein the dry vacuuming robot is configured to detect the stain via the stain sensing system and deploy the beacon at the location of the detected stain and the beacon is operably coupled to the controller such that the beacon guides the deep cleaning robot to the location.

2. The autonomous floor cleaning system of claim 1 wherein the stain sensing system includes a stain sensor that is any one of a color spectrum image sensor, a light reader, and IR dirt sensor, an odor sensor, or a wet mess sensor to detect a size, shape, or type of stain.

3. The autonomous floor cleaning system of claim 1 wherein the beacon comprises a radio-frequency identification tag.

4. The autonomous floor cleaning system of claim 3 wherein the deep cleaning robot comprises a radio-frequency identification reader configured for reading and interpreting a signal from the radio-frequency identification tag on the beacon to guide the deep cleaning robot to the location of the stain.

5. The autonomous floor cleaning system of claim 3 wherein the dry vacuuming robot comprises a radio-frequency identification reader configured for reading and interpreting signal from the radio-frequency identification tag on the beacon and the dry vacuuming robot guides the deep cleaning robot to the location of the stain.

6. The autonomous floor cleaning system of claim 1 wherein the dry vacuuming robot instructs the deep cleaning robot to perform a cycle of operation to clean the stain.

7. The autonomous floor cleaning system of claim 6 wherein the dry vacuuming robot and the deep cleaning robot each include a wireless radio and the dry vacuuming robot communicates instructions to the deep cleaning robot to perform the cycle of operation to clean the stain via the wireless radios.

8. The autonomous floor cleaning system of claim 6 wherein the dry vacuuming robot uses information from the stain sensing system to determine a type of stain and a floor surface type to determine a cleaning cycle appropriate for the stain.

9. The autonomous floor cleaning system of claim 1 wherein the dry vacuuming robot is configured to detect, locate and deploy a set of beacons for multiple stains.

10. The autonomous floor cleaning system of claim 9 wherein the controller of the deep cleaning robot is configured to treat each stain of the multiple stains in sequential order of beacons deployed when the dry vacuuming robot is not in operation.

11. An autonomous floor cleaning system, comprising:
    a dry vacuuming robot for generating a working airflow for removing dirt from a surface to be cleaned and storing the dirt in a collection space, the dry vacuuming robot further comprising:
        a drive system for autonomously moving the dry vacuuming robot over the surface to be cleaned;
        a stain sensing system for detecting a stain; and
        a beacon deployment system for selectively deploying a beacon at a location of the stain;
    a deep cleaning robot for storing a cleaning fluid and delivering the cleaning fluid to the surface to be cleaned, and for removing the cleaning fluid and debris from the surface to be cleaned and storing the recovered cleaning fluid and debris, the deep cleaning robot further comprising:
        a controller for controlling the operation of the deep cleaning robot; and
        a drive system for autonomously moving the deep cleaning robot over the surface to be cleaned based on inputs from the controller; and
    wherein the dry vacuuming robot is configured to detect the stain via the stain sensing system and deploy the beacon at the location of the detected stain and the beacon is operably coupled to the controller such that the beacon guides the deep cleaning robot to the location; and
    wherein one of the dry vacuuming robot or the deep cleaning robot further comprises a beacon retainer configured to retrieve the beacon from the surface.

12. The autonomous floor cleaning system of claim 11 wherein the beacon deployment system stores one or more beacons on the dry vacuuming robot.

13. The autonomous floor cleaning system of claim 11 wherein the beacon retainer is further configured to selectively release the beacon.

14. The autonomous floor cleaning system of claim 13 wherein the beacon retainer further comprises a hook configured to catch a slot on the beacon and an actuator configured to selectively push the beacon off the hook.

15. The autonomous floor cleaning system of claim 13 wherein the beacon retainer further comprises a clamp configured to selectively retain the beacon.

16. The autonomous floor cleaning system of claim 11 wherein the stain sensing system includes a stain sensor that is any one of a color spectrum image sensor, a light reader, and IR dirt sensor, an odor sensor, or a wet mess sensor to detect a size, shape, or type of stain.

17. The autonomous floor cleaning system of claim 11 wherein the beacon comprises a radio-frequency identification tag.

18. The autonomous floor cleaning system of claim 17 wherein the deep cleaning robot comprises a radio-frequency identification reader configured for reading and interpreting a signal from the radio-frequency identification tag on the beacon to guide the deep cleaning robot to the location of the stain.

19. The autonomous floor cleaning system of claim 17 wherein the dry vacuuming robot comprises a radio-frequency identification reader configured for reading and interpreting signal from the radio-frequency identification tag on the beacon and the dry vacuuming robot guides the deep cleaning robot to the location of the stain.

20. The autonomous floor cleaning system of claim 11 wherein the dry vacuuming robot instructs the deep cleaning robot to perform a cycle of operation to clean the stain.

21. The autonomous floor cleaning system of claim 20 wherein the dry vacuuming robot and the deep cleaning robot each include a wireless radio and the dry vacuuming robot communicates instructions to the deep cleaning robot to perform the cycle of operation to clean the stain via the wireless radios.

22. The autonomous floor cleaning system of claim 20 wherein the dry vacuuming robot uses information from the stain sensing system to determine a type of stain and a floor surface type to determine a cleaning cycle appropriate for the stain.

23. The autonomous floor cleaning system of claim 11 wherein the dry vacuuming robot is configured to detect, locate and deploy a set of beacons for multiple stains.

24. The autonomous floor cleaning system of claim 23 wherein the controller of the deep cleaning robot is configured to treat each stain of the multiple stains in sequential order of beacons deployed when the dry vacuuming robot is not in operation.

* * * * *